(12) United States Patent
Hill

(10) Patent No.: US 6,806,961 B2
(45) Date of Patent: Oct. 19, 2004

(54) INTERFEROMETRIC CYCLIC ERROR COMPENSATION

(75) Inventor: Henry A. Hill, Tucson, AZ (US)

(73) Assignee: Zygo Corporation, Middlefield, CT (US)

(*) Notice: Subject to any disclaimer, the term of this patent is extended or adjusted under 35 U.S.C. 154(b) by 0 days.

(21) Appl. No.: 10/287,898

(22) Filed: Nov. 5, 2002

(65) Prior Publication Data

US 2003/0095265 A1 May 22, 2003

Related U.S. Application Data

(60) Provisional application No. 60/337,478, filed on Nov. 5, 2001.

(51) Int. Cl.[7] ............................................... G01B 9/02
(52) U.S. Cl. ..................... 356/487; 356/509; 356/498
(58) Field of Search ................................. 356/485, 486, 356/487, 490, 500, 520, 509, 508, 470

(56) References Cited

U.S. PATENT DOCUMENTS

| | | | |
|---|---|---|---|
| 4,948,254 A | | 8/1990 | Ishida |
| 5,331,400 A | * | 7/1994 | Wilkening et al. .......... 356/487 |
| 5,404,222 A | | 4/1995 | Lis |
| 5,483,343 A | | 1/1996 | Iwamoto et al. |
| 5,663,793 A | | 9/1997 | de Groot |
| 5,764,362 A | | 6/1998 | Hill et al. |
| 5,838,485 A | * | 11/1998 | de Groot et al. ............ 356/484 |
| 6,008,902 A | | 12/1999 | Rinn |
| 6,124,931 A | * | 9/2000 | Hill ........................... 356/517 |
| 6,137,574 A | * | 10/2000 | Hill ........................... 356/486 |
| 6,160,619 A | | 12/2000 | Magome |
| 6,181,420 B1 | | 1/2001 | Badami et al. |
| 6,201,609 B1 | | 3/2001 | Hill et al. |
| 6,246,481 B1 | | 6/2001 | Hill |
| 6,252,668 B1 | | 6/2001 | Hill |

FOREIGN PATENT DOCUMENTS

| | | |
|---|---|---|
| JP | 351078 | 12/1995 |
| JP | 117083 | 4/1996 |

OTHER PUBLICATIONS

Badami V.G. et al., "Investigation of Nonlinearity in High Accuracy Heterodyne Laser Interferometry," 1997 Proceedings, vol. 16, pp. 153–156.

Wu, C.M. et al., "Analytical Modeling of the Periodic Nonlinearity in Heterodyne Interferometry," Applied Optics, vol. 37, No. 28, Oct. 1, 1998, pp. 6696–6700.

Oka K. et al., "Polarization Heterodyne Interferometry Using Another Local Oscillator Beam," Optics Communications, 92 (1992), 1–5.

Hines, B. et al., "Sub–Nanometer Laser Metrology—Some Techniques and Models," Jet Propulsion Laboratory, California Institute of Technology, pp. 1195–1204.

Bobroff, N., "Recent Advances in Displacement Measuring Interferometry." Measurement Science & Technology, vol. 4, No. 9, Sept. 1993, pp. 907–926.

Isshiki et al., U. S. patent application Publication US 2002/0048026 A1, Published Apr. 25, 2002, entitled "Laser Interferometer Displacement Measuring System, Exposure Apparatus, and Elecron Beam Lithography Apparatus."

Hill, U. S. patent application Publication US 2002/0089671 A1, Published Jul. 11, 2002,entitled "Interferometric ervo Control System for Stage Metrology,".

* cited by examiner

Primary Examiner—Samuel A. Turner
Assistant Examiner—Patrick Connolly
(74) Attorney, Agent, or Firm—Fish & Richardson P.C.

(57) ABSTRACT

The invention features an interferometry method including: directing two beams derived from a common source along different paths; producing a first output beam derived from a first portion of each of the two beams; producing a second output beam derived from a second portion of each of the two beams; and calculating a product of a first signal derived from the first output beam and a second signal derived from the second output beam.

60 Claims, 10 Drawing Sheets

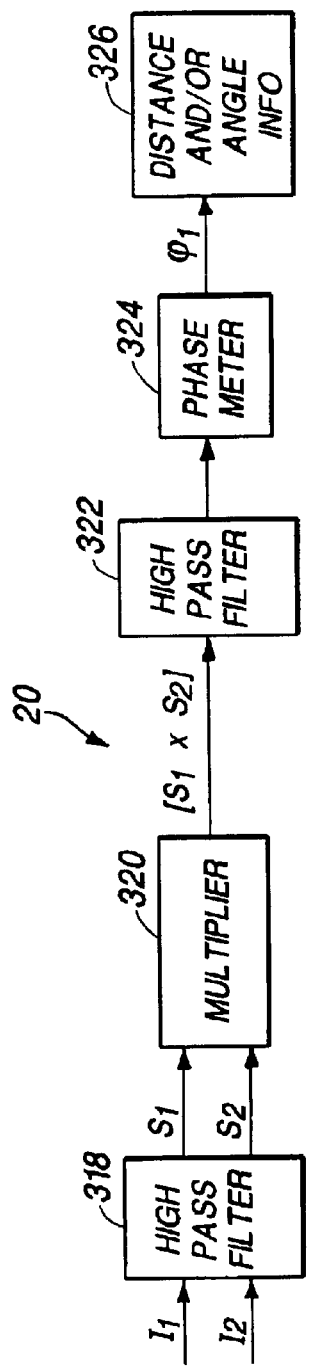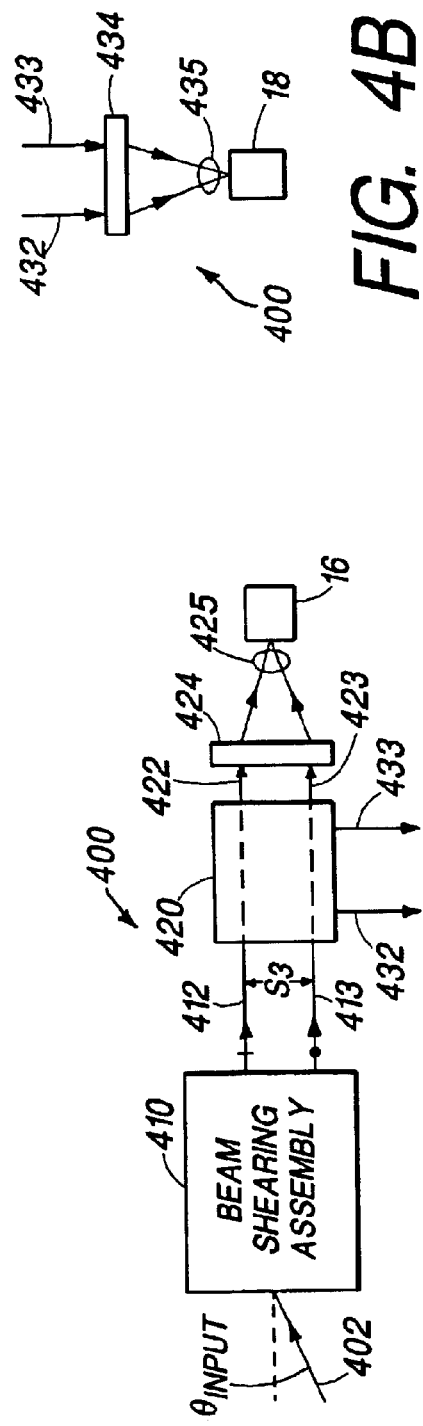

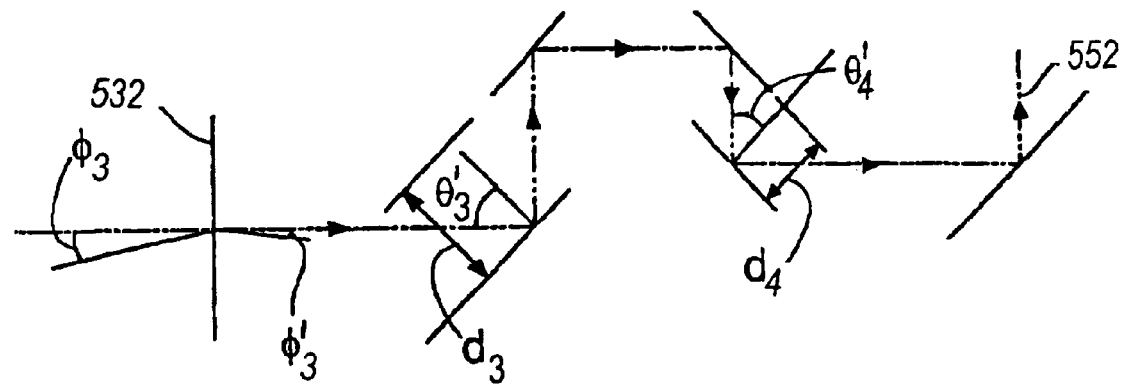
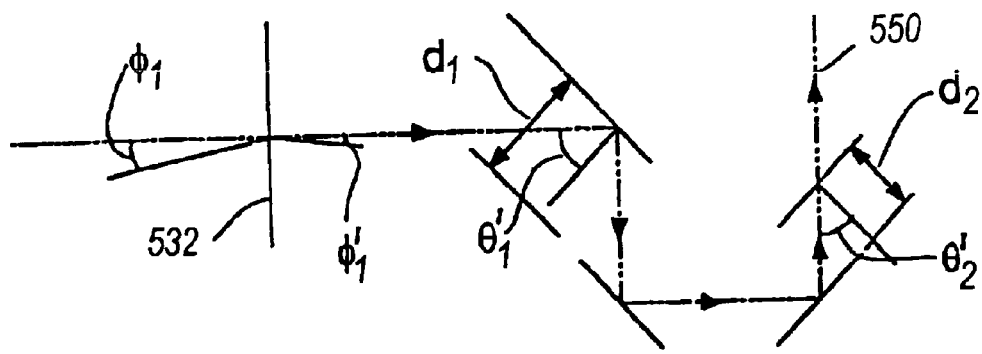
FIG. 5B
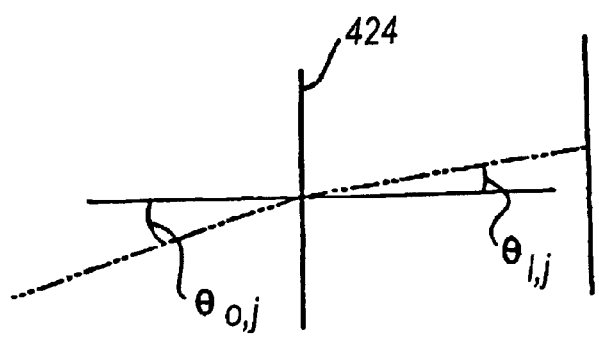
FIG. 5C

INTERFEROMETRIC CYCLIC ERROR COMPENSATION

CROSS-REFERENCE TO RELATED APPLICATIONS

This application claims priority under 35 USC §119(e) to Provisional Patent Application 60/337,478, filed on Nov. 5, 2001, entitled "CYCLIC ERROR COMPENSATION AND RESOLUTION ENHANCEMENT," to Henry A. Hill, the contents of which is incorporated herein by reference.

BACKGROUND

This invention relates to interferometers, e.g., displacement measuring and dispersion interferometers that measure displacements of a measurement object such as a mask stage or a wafer stage in a lithography scanner or stepper system, and also interferometers that monitor wavelength and determine intrinsic properties of gases.

Displacement measuring interferometers monitor changes in the position of a measurement object relative to a reference object based on an optical interference signal. The interferometer generates the optical interference signal by overlapping and interfering a measurement beam reflected from the measurement object with a reference beam reflected from the reference object.

In many applications, the measurement and reference beams have orthogonal polarizations and different frequencies. The different frequencies can be produced, for example, by laser Zeeman splitting, by acousto-optical modulation, or internal to the laser using birefringent elements or the like. The orthogonal polarizations allow a polarizing beam splitter to direct the measurement and reference beams to the measurement and reference objects, respectively, and combine the reflected measurement and reference beams to form overlapping exit measurement and reference beams. The overlapping exit beams form an output beam that subsequently passes through a polarizer. The polarizer mixes polarizations of the exit measurement and reference beams to form a mixed beam. Components of the exit measurement and reference beams in the mixed beam interfere with one another so that the intensity of the mixed beam varies with the relative phase of the exit measurement and reference beams. A detector measures the time-dependent intensity of the mixed beam and generates an electrical interference signal proportional to that intensity. Because the measurement and reference beams have different frequencies, the electrical interference signal includes a "heterodyne" signal having a beat frequency equal to the difference between the frequencies of the exit measurement and reference beams. If the lengths of the measurement and reference paths are changing relative to one another, e.g., by translating a stage that includes the measurement object, the measured beat frequency includes a Doppler shift equal to $2vnp/\lambda$, where $v$ is the relative speed of the measurement and reference objects, $\lambda$ is the wavelength of the measurement and reference beams, $n$ is the refractive index of the medium through which the light beams travel, e.g., air or vacuum, and $p$ is the number of passes to the reference and measurement objects. Changes in the relative position of the measurement object correspond to changes in the phase of the measured interference signal, with a $2\pi$ phase change substantially equal to a distance change L of $\lambda/(np)$, where L is a round-trip distance change, e.g., the change in distance to and from a stage that includes the measurement object.

Unfortunately, this equality is not always exact. Many interferometers include nonlinearities such as what are known as "cyclic errors." The cyclic errors can be expressed as contributions to the phase and/or the intensity of the measured interference signal and have a sinusoidal dependence on the change in optical path length pnL. In particular, the first order cyclic error in phase has a sinusoidal dependence on $(2\pi pnL)/\lambda$ and the second order cyclic error in phase has a sinusoidal dependence on $2(2\pi pnL)/\lambda$. Higher order cyclic errors can also be present.

Cyclic errors can be produced by "beam mixing," in which a portion of an input beam that nominally forms the reference beam propagates along the measurement path and/or a portion of an input beam that nominally forms the measurement beam propagates along the reference path. Such beam mixing can be caused by ellipticity in the polarizations of the input beams and imperfections in the interferometer components, e.g., imperfections in a polarizing beam splitter used to direct orthogonally polarized input beams along respective reference and measurement paths. Because of beam mixing and the resulting cyclic errors, there is not a strictly linear relation between changes in the phase of the measured interference signal and the relative optical path length pnL between the reference and measurement paths. If not compensated, cyclic errors caused by beam mixing can limit the accuracy of distance changes measured by an interferometer. Cyclic errors can also be produced by imperfections in transmissive surfaces that produce undesired multiple reflections within the interferometer and imperfections in components such as retroreflectors and/or phase retardation plates that produce undesired ellipticities in beams in the interferometer. For a general reference on the theoretical cause of cyclic error, see, for example, C. W. Wu and R. D. Deslattes, "Analytical modelling of the periodic nonlinearity in heterodyne interferometry," *Applied Optics,* 37, 6696–6700, 1998.

In dispersion measuring applications, optical path length measurements are made at multiple wavelengths, e.g., 532 nm and 1064 nm, and are used to measure dispersion of a gas in the measurement path of the distance measuring interferometer. The dispersion measurement can be used to convert the optical path length measured by a distance measuring interferometer into a physical length. Such a conversion can be important since changes in the measured optical path length can be caused by gas turbulence and/or by a change in the average density of the gas in the measurement arm even though the physical distance to the measurement object is unchanged. In addition to the extrinsic dispersion measurement, the conversion of the optical path length to a physical length requires knowledge of an intrinsic value of the gas. The factor $\Gamma$ is a suitable intrinsic value and is the reciprocal dispersive power of the gas for the wavelengths used in the dispersion interferometry. The factor $\Gamma$ can be measured separately or based on literature values. Cyclic errors in the interferometer also contribute to dispersion measurements and measurements of the factor $\Gamma$. In addition, cyclic errors can degrade interferometric measurements used to measure and/or monitor the wavelength of a beam.

SUMMARY

The invention relates to the compensation of cyclic errors in interferometric measurements, such as those used in microlithography systems that fabricate integrated circuits. The interferometric measurements can include changes in a linear displacement of an object, changes in angular orientation of an object, and/or changes in the propagation direction of an optical beam. A number of the embodiments involve heterodyne interferometry and the calculation of a superheterodyne signal corresponding to the product of two signals derived from corresponding intensity measurements of interferometric output beams having orthogonal linear polarizations. The phase of the superheterodyne signal provides information about the different paths traversed by the reference and measurement beam components of the interferometric output beams (e.g., a displacement and/or angle measurement). The calculation of the superheterodyne signal eliminates or substantially reduces first-order cyclic error terms in its phase, thereby improving the accuracy of the information derived from the phase of the superheterodyne signal.

Moreover, the elimination or reduction of the first-order cyclic error contribution to the superheterodyne phase is independent of many aspects of the electronics used to generate the superheterodyne signal. Such aspects include differences in the sensitivity of the detectors used to measure the intensity of the output beams, and differences in the gains of the preamplifiers and/or amplifiers that amplify those intensities and related downstream signals. In addition, the calculation of the superheterodyne signal increases the phase resolution of the interferometer system by a factor of 2.

In one embodiment, for example, the invention features a method that includes: i) directing two beams derived from a common source along different paths in an interferometer, wherein the two beams have orthogonal polarizations and frequencies that differ by a heterodyne frequency; ii) producing a first output beam derived from a portion of each of the two beams having a first common polarization; iii) producing a second output beam derived from a portion of each of the two beams having a second common polarization substantially orthogonal to the first common polarization; iv) generating first and second signals derived from intensity measurements of the first and second output beams, respectively; v) calculating a superheterodyne signal corresponding to a product of the first and second signals to substantially eliminate at least some first-order cyclic errors present in the first and second signals; and vi) extracting the phase of the superheterodyne signal to provide information related to the different paths in the interferometer. For example, the information related to the different paths can be a change in position of an object in one of the different paths or an angular deviation of an input beam from which the beams in the interferometer are derived. Also, the generation of the first and second signals can include passing each of the measured intensities through a high band pass filter.

More generally, in one aspect, the invention features an interferometry method including: directing two beams derived from a common source along different paths; producing a first output beam derived from a first portion of each of the two beams; producing a second output beam derived from a second portion of each of the two beams; and calculating a product of a first signal derived from the first output beam and a second signal derived from the second output beam.

Embodiments of the method may include any of the following features.

The two beams may be directed along the different paths within a distance measuring interferometer, for example, a single-pass distance measuring interferometer or a double-pass distance measuring interferometer. Alternatively, the two beams may be directed along the different paths within an angle measuring interferometer. For example, the angle-measuring interferometer may include a beam shearing assembly.

Calculating the product of the first and second signals may substantially eliminate at least some first-order cyclic errors present in the first and second signals from the calculated product.

The method may further include extracting from the calculated product information related to the different paths. For example, the information may correspond to a change in position of an object in one of the different paths. Alternatively, the two beams may be derived from an input beam, and the information may correspond to an angular deviation of the input beam.

The first portions may have a first common polarization, and the second portions may have a second common polarization different from the first common polarization. For example, the first and second common polarizations may be substantially orthogonal.

Moreover, producing the first and second output beams may include combining the two beams and directing the combined beams to a polarizing beam-splitter to produce the first and second output beams. In other embodiments, producing the first and second output beams may include combining the two beams, directing the combined beams to a non-polarizing beam-splitter to produce first and second intermediate beams, and directing each of the intermediate beams to a polarizer to produce the first and second output beams. In yet further embodiments, producing the first and second output beams may include separating each of the two beams into the portion having the first common polarization and the portion having the second common polarization, combining the portions having the first common polarization to produce the first output beam, and combining the portions having the second common polarization to produce the second output beam.

Also, the method may further include passing one of the directed beams and not the other of the directed beams through a first polarizer prior to producing the first and second output beams. For example, the first common polarization may be a linear polarization, and the first polarizer may be oriented at 45 degrees to the first common linear polarization. The method may further include passing the other of the directed beams through a second polarizer prior to producing the first and second output beams. For example, the first and second polarizers may be oriented to pass orthogonal linear polarizations.

The method may also include directing an input beam derived from the common source to a polarizing beam-splitter to produce the two beams directed along the different paths.

The two beams directed along the different paths may have frequencies that differ by a heterodyne frequency. In such embodiments, the product of the first signal and the second signal may include a superheterodyne term. Furthermore, the method may also include extracting a phase of the superheterodyne signal.

The method may also include generating the first signal by measuring an intensity of the first output beam and generating the second signal by measuring an intensity of the second output beam. Furthermore, generating the first and second signals may also include passing each of the measured intensities through a high band pass filter.

In another aspect, the invention features a lithography method for use in fabricating integrated circuits on a wafer. The lithography method includes: supporting the wafer on a moveable stage; imaging spatially patterned radiation onto the wafer; adjusting the position of the stage; and measuring the position of the stage using the interferometry method described above.

In another aspect, the invention features a lithography method for use in the fabrication of integrated circuits. The lithography method includes: directing input radiation through a mask to produce spatially patterned radiation; positioning the mask relative to the input radiation; measuring the position of the mask relative to the input radiation using the interferometry method described above; and imaging the spatially patterned radiation onto a wafer.

In another aspect, the invention features a lithography method for fabricating integrated circuits on a wafer. The lithography method includes: positioning a first component of a lithography system relative to a second component of a lithography system to expose the wafer to spatially patterned radiation; and measuring the position of the first component relative to the second component using the interferometry method described above.

In another aspect, the invention features a method for fabricating integrated circuits, the method including any of the lithography methods described above.

In another aspect, the invention features a beam writing method for use in fabricating a lithography mask, the method including: directing a write beam to a substrate to pattern the substrate; positioning the substrate relative to the write beam; and measuring the position of the substrate relative to the write beam using the interferometry method described above.

In general, in another aspect, the invention features an interferometry system including: i) an interferometer configured to direct two beams derived from a common source along different paths and produce a first output beam derived from a first portion of each of the two beams and a second output beam derived from a second portion of each of the two beams; ii) first and second detectors positioned to measure an intensity of the first and second output beams, respectively; and iii) an electronic processor coupled to the first and second detectors, wherein during operation the electronic processor calculates a product of a first signal derived from the intensity of the first output beam and a second signal derived from the intensity of the second output beam.

Embodiments of the interferometry system may include any of the following features.

The interferometer may include a distance measuring interferometer, for example, a single-pass distance measuring interferometer or a double-pass distance measuring interferometer. Alternatively, the interferometer may include an angle measuring interferometer. For example, the angle measuring interferometer may include a beam shearing assembly.

The product calculated by the electronic processor may substantially eliminates at least some first-order cyclic errors present in the first and second signals.

During operation the electronic processor may also extract from the calculated product information related to the different paths in the interferometer. For example, the information may correspond to a change in position of an object in one of the different paths. In other embodiments, for example, the interferometer may be configured to derive the two beams from an input beam, and wherein the information extracted by the electronic processor corresponds to an angular deviation of the input beam.

The interferometer may be configured to cause the first portions to have a first common polarization and the second portions to have a second common polarization different from the first common polarization. For example, the first and second common polarizations may be substantially orthogonal.

In some embodiments, the interferometer includes a polarizing beam splitter, and the interferometer is configured to combine the two beams after directing them along the different paths and then direct the combined beams to the polarizing beam-splitter to produce the first and second output beams. In other embodiments, the interferometer includes a non-polarizing beam splitter and two polarizers, and the interferometer is configured to combine the two beams after directing them along the different paths, direct the combined beams to the non-polarizing beam-splitter to produce first and second intermediate beams, and direct each of the intermediate beams to a corresponding one of the polarizers to produce the first and second output beams. In yet further embodiments, the interferometer is configured to separate each of the two beams into the portion having the first common polarization and the portion having the second common polarization, combine the portions having the first common polarization to produce the first output beam, and combine the portions having the second common polarization to produce the second output beam.

The interferometer may also includes a first polarizer, and the interferometer may be configured to further pass one of the directed beams and not the other of the directed beams through the first polarizer prior to producing the first and second output beams. For example, the first common polarization may be a linear polarization, and the first polarizer may be oriented at 45 degrees to the first common linear polarization. The interferometer may also include a second polarizer, and the interferometer may be configured to pass the other of the directed beams through the second polarizer prior to producing the first and second output beams. For example, the first and second polarizers may be oriented to pass orthogonal linear polarizations.

The interferometer may include a polarizing beam-splitter positioned to receive an input beam and produce the two beams to be directed along the different paths.

The interferometry system may include the common source. For example, the common source may be configured to introduce a heterodyne frequency difference between the two beams directed along the different paths by the interferometer. Furthermore, the product calculated by the electronic processor may include a superheterodyne term. Moreover, during operation the electronic processor may extract a phase of the superheterodyne signal. Also, the electronic processor may include a high band pass filter, and during operation the electronic processor may pass the measured intensity for each of the first and second output beams through the high band pass filter to generate the first and second signals.

In another aspect, the invention features a lithography system for use in fabricating integrated circuits on a wafer. The lithography system includes: a stage for supporting the wafer; an illumination system for imaging spatially patterned radiation onto the wafer; a positioning system for adjusting the position of the stage relative to the imaged radiation; and the interferometry system described above for monitoring the position of the wafer relative to the imaged radiation.

In another aspect, the invention features a lithography system for use in fabricating integrated circuits on a wafer. The lithography system includes: a stage for supporting the wafer; and an illumination system including a radiation source, a mask, a positioning system, a lens assembly, and the interferometry system described above; wherein during operation the source directs radiation through the mask to produce spatially patterned radiation, the positioning system adjusts the position of the mask relative to the radiation from the source, the lens assembly images the spatially patterned radiation onto the wafer, and the interferometry system monitors the position of the mask relative to the radiation from the source.

In another aspect, the invention features a beam writing system for use in fabricating a lithography mask, the system including: a source providing a write beam to pattern a substrate; a stage supporting the substrate; a beam directing assembly for delivering the write beam to the substrate; a positioning system for positioning the stage and beam directing assembly relative one another; and the interferometry system described above for monitoring the position of the stage relative to the beam directing assembly.

The details of one or more embodiments of the invention are set forth in the accompanying drawings and the description below. Other features, objects, and advantages of the invention will be apparent from the description and drawings, and from the claims.

DESCRIPTION OF DRAWINGS

The invention will now be further described merely by way of example with reference to the accompanying drawings in which:

FIG. 3 is a schematic diagram for one embodiment of the electronic processor of FIG. 1;

FIGS. 4a and 4b are schematic diagrams of an angle-measuring interferometer for use with the interferometry system of FIG. 1;

FIGS. 5b, 5c, and 5d illustrate beams paths within the beam shearing assembly of FIG. 5a;

Like reference symbols in the various drawings indicate like elements.

DETAILED DESCRIPTION

Figure 1:
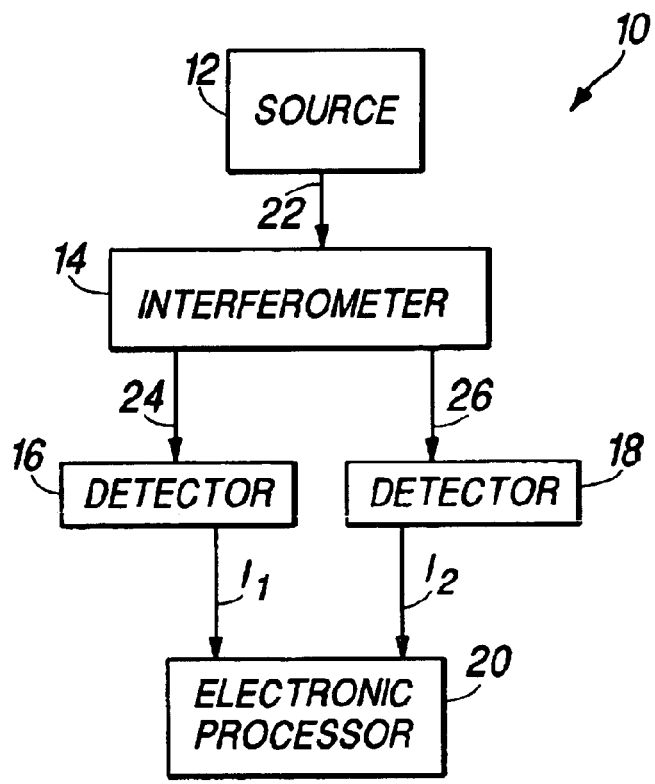
FIG. 1 is a schematic diagram of an interferometry system that substantially reduces the contribution of first-order cyclic errors.

FIG. 1 shows an interferometry system 10 that reduces the contribution of first-order cyclic errors to an interferometric measurement, such as the measurement of a change in a linear displacement of an object, a measurement of a change in angular orientation of an object, and/or a measurement of a change in the propagation direction of an optical beam. System 10 includes a light source 12, an interferometer 14, a pair of detectors 16 and 18, and an electronic processor 20.

Light source 12 provides a progenitor beam for light beams in interferometer 14, for example, an input beam 22. Light source 12 generates input beam 22 to include two orthogonally polarized beam components having a difference in frequencies of $f_1$, which defines a heterodyne frequency. To generate the heterodyne frequency difference, source 12 can include, for example, a Zeeman-split laser or an acousto-optical modulator, as is well known in the art.

Interferometer 14 derives two interferometer beams (e.g., a measurement beam and a reference beam) from input beam 22 and directs them along different paths within the interferometer. Typically, the two interferometer beam correspond to the orthogonally polarized beam components having the different frequencies. For example, interferometer 14 can include a polarizing beam splitter that separates the input beam into its orthogonally polarized beam components to define the two interferometer beams. In some embodiments, interferometer 14 is configured to measure a change in position of a measurement object that directs one of the interferometer beams along its path (e.g., by reflection). In other embodiments, the interferometer may be configured to measure a change in angular orientation of the measurement object. In yet further embodiments, the interferometer may be configured to measure a change in the propagation angle of the input beam to the interferometer. In such embodiments, the light from source 12 is typically redirected by one or more optics prior to entering interferometer 14 as input beam 22, and the purpose of the interferometer is to determine angular orientation information about the optic(s) that redirect the input beam.

After directing the interferometer beams the different paths, interferometer 14 produces a first output beam 24 derived from a first portion of each of the two interferometer beams having a first common polarization, and a second output beam 26 derived from a second portion of each of the two beams having a second common polarization that is substantially orthogonal to the first common polarization. For example, in some embodiments, interferometer 14 recombines the two interferometer beams and then directs the recombined beam to a polarizing beam splitter oriented at an angle to the linear polarization state of either of the interferometer beams (i.e., to mix the polarizations of the interferometer beams). As a result, the polarizing beam splitter produces two output beams having orthogonal polarizations and each including a component from each of the interferometer beams.

Detectors 16 and 18 measure the intensities output beams 24 and 26 to produce intensity signals $I_1$ and $I_2$, respectively. Electronic processor 20 receives those intensity signals and processes them to produce a superheterodyne signal corresponding to a product of a first signal derived from $I_1$ and a second signal derived from $I_2$. Electronic processor 20 then extracts the phase $\phi_1$ of the superheterodyne signal to provide information related to the optical path length difference between the different paths in the interferometer. As explained further below, the calculation of the superheterodyne signal substantially reduces (e.g., eliminates) first-order cyclic errors present in the intensity signals, thereby improving the accuracy of the information derived from the phase of the superheterodyne signal. In generating the signal precursors to the superheterodyne signal and the superheterodyne signal itself, electronic processor 20 can include band pass filters for isolating the interference terms at the heterodyne frequency $f_1$ and superheterodyne frequencies $2f_1$.

Figure 2C:
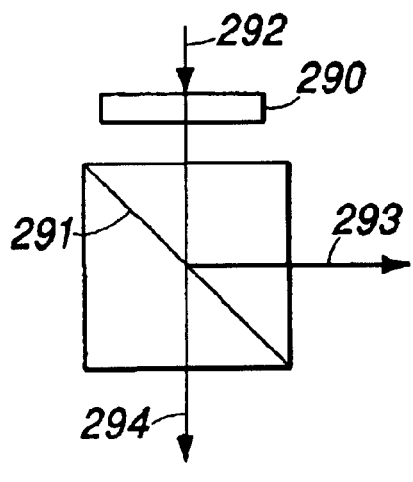
FIG. 2c is an alternative embodiment for the analyzer system in the interferometers FIGS. 2a and 2b.
Figure 2D:
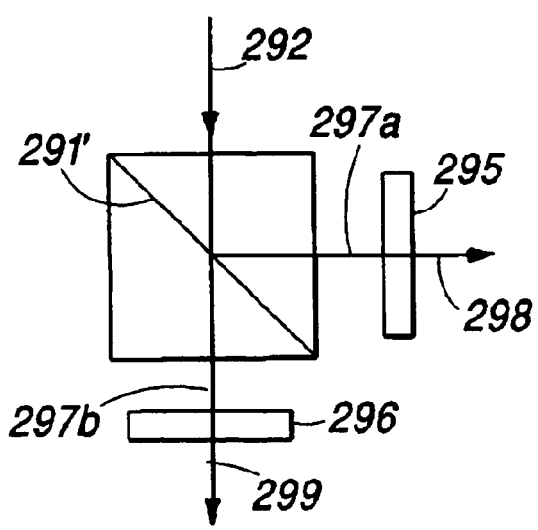
FIG. 2d is yet another alternative embodiment for the analyzer system in the interferometers FIGS. 2a and 2b.
Figure 2A:
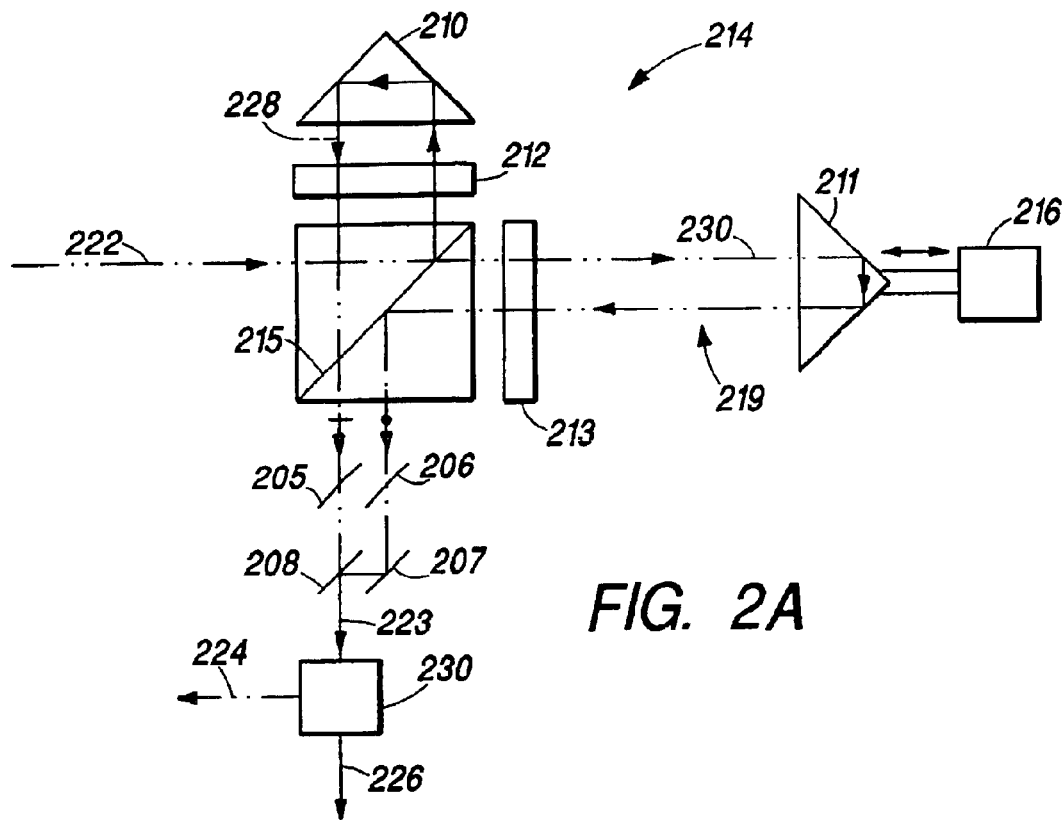
FIG. 2a is a schematic diagram of one embodiment of a distance-measuring interferometer for use with the interferometry system of FIG. 1.

Referring now to FIG. 2a, one embodiment of interferometer 14 is the linear displacement interferometer 214, which is a polarizing, heterodyne, single pass interferometer. Interferometer 214 receives an input beam 222 that includes two linearly orthogonally polarized optical beam components having a difference in frequencies of $f_1$. The planes of polarization of the two orthogonally polarized components are parallel and orthogonal to the plane of FIG. 2a, respectively.

Interferometer 214 includes a reference retroreflector 210, object retroreflector 211, quarter-wave phase retardation plates 212 and 213, and a polarizing beam splitter 215. This configuration is known in the art as a polarized Michelson interferometer. The position of object retroreflector 211 is controlled by translator 216.

Polarizing beam splitter 215 separates input beam 222 into a reference beam 228 and a measurement beam 230, which propagate along reference and measurement paths respectively. The reference beam reflects from reference retroreflector 210, double passes quarter-wave plate 212, and then exits polarizing beam splitter 215 with a linear polarization parallel to the plane of FIG. 2a. The measurement beam traverses measuring region 219, reflects from object retroreflector 211, double passes quarter-wave plate 213, and exits polarizing beam splitter 215 with a linear polarization perpendicular to the plane of FIG. 2a. The reference and measurement beams that exit polarizing beam splitter 215 contain information at the wavelength $\lambda_1$ of the input beam about the optical path length of the reference and measurement paths, respectively.

To enhance their polarization purity, which as will be described further below can enhance the cyclic error compensation, the reference and measurement beams that exit polarizing beam splitter 215 pass through polarizers 205 and 206, respectively. Thereafter, the beams are combined by mirror 207 and polarizing beam splitter 208 to form combined beam 223. The combined beam is then incident on analyzer 230, which is oriented to mix the polarizations of the reference and measurement beams and produce output beams 224 and 226. Output beams 224 and 226 correspond to output beams 24 and 26, respectively, in FIG. 1. Analyzer 230 is a polarizing beam-splitter oriented so that the plane of incidence of combined beam 223 is substantially at an angle (e.g., 45 degrees) with respect to the plane of FIG. 2a. In other words, output beam 224 is propagating substantially at an angle (e.g., of 45 degrees) with respect to the plane of FIG. 2a. The output beams 224 and 226 are then incident on corresponding detectors to produce intensity signals $I_1$ and $I_2$, respectively, as described with reference to FIG. 1.

Interferometer 214 introduces phase shift $\phi_1$ between the reference and measurement beam components of each of the output beam. The magnitude of phase shift $\phi_1$ is related to round-trip physical length $L_1$ of measuring region 219 according to the formula $$\phi_1 = L_1 p k_1 n_1 \tag{1}$$

where p is the number of passes through the respective reference and measurement legs, $n_1$ is the refractive index of the gas in measuring region 219, and $k_1$ is the wave number of the measurement beam. The interferometer shown in FIG. 2a is a single-pass interferometer, i.e., p=1 so as to illustrate in a simple manner the present invention without departing from the spirit and scope of the present invention. In other embodiments the interferometer may include multiple passes, e.g., it may be a double pass interferometer.

Moreover, in other embodiments, the interferometer may be a single-pass interferometer different from the one shown in FIG. 2a. For example, other embodiments need not implement polarizers 205 and 206 for enhancing the polarization purity of the reference and measurement beams exiting the interferometer paths. In such cases, for example, the position of object retroreflector 211 can be translated along a direction perpendicular to the incident measurement beam to cause the reference and measurement beams to exit collinearly from polarizing beam splitter 215. In such an embodiment, the superposition of the reference and measurement beams exiting polarizing beam splitter 215 form the combined beam to be incident on analyzer 230, and thus mirror 207 and beam splitter 208 are no longer necessary.

Figure 2B:
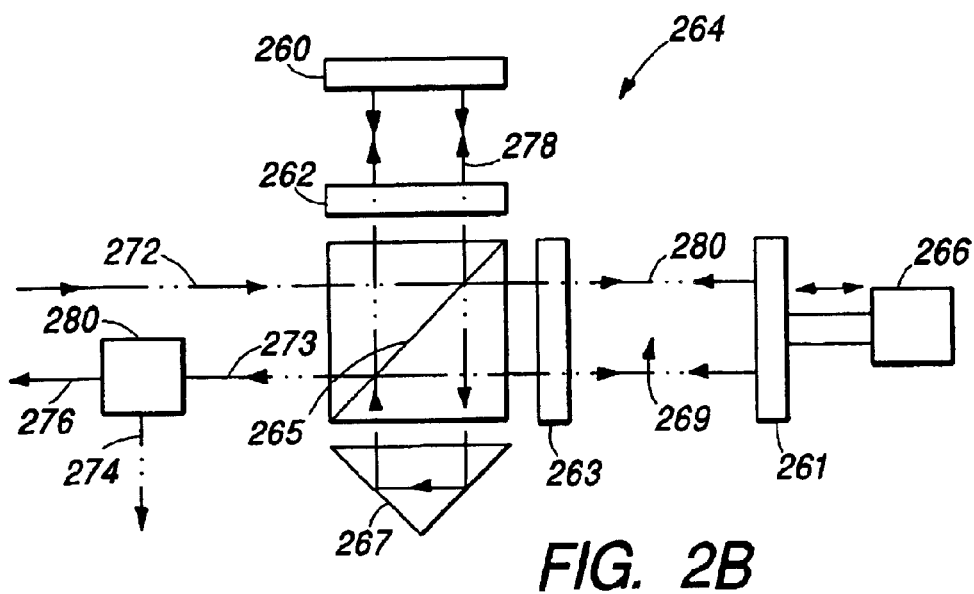
FIG. 2b is another embodiment of a distance-measuring interferometer for use with the interferometry system of FIG. 1.

Another embodiment of interferometer 14 is a high-stability plane mirror interferometer (HSPMI) 264, as shown in FIG. 2b. Interferometer 264 includes a polarizing beam splitter 265, quarter wave plates 262 and 263, a reference mirror 260, a measurement mirror 261 coupled to translator 266, and a common retroreflector 267. During operation, polarizing beam splitter 265 receives an input beam 272 and separates it into a reference beam 278 and a measurement beam 280.

Referring to FIG. 2b, reference beam 278 reflects from reference mirror 260 and returns to polarizing beam splitter 265 after double passing quarter wave plate 262. The quarter wave plate is oriented to rotate the linear polarization of the reference beam by 90 degrees following the double pass to cause polarizing beam splitter 265 to transmit the reference beam to common retroreflector 267. The common retroreflector then redirects the reference beam back through polarizing beam splitter 265 towards the reference mirror, which in turn reflects it back to polarizing beam splitter 265 following another double pass through quarter wave plate 262. The double pass through the quarter wave plate again rotates the linear polarization of the reference beam by 90 degrees, which causes polarizing beam splitter 265 to now reflect the reference beam as the reference beam component of a combined beam 273.

Still referring to FIG. 2b, measurement beam 280 propagates through measuring region 269 and then reflects from measurement mirror 261 to return back to polarizing beam splitter 265 after double passing quarter wave plate 263. The quarter wave plate is oriented to rotate the linear polarization of the measurement beam by 90 degrees following the double pass to cause polarizing beam splitter 265 to reflect the reference beam to common retroreflector 267. The common retroreflector then redirects the reference beam back to polarizing beam splitter 265, which reflects it back to the measurement mirror through measuring region 269. The measurement mirror then reflects the measurement beam back to polarizing beam splitter 265 following another double pass through quarter wave plate 262. The double pass through the quarter wave plate again rotates the linear polarization of the measurement beam by 90 degrees, which causes polarizing beam splitter 265 to now transmit the measurement beam as the measurement beam component of a combined beam 273.

Combined beam 273 is then incident on analyzer 280 to produce output beams 274 and 276, which correspond to output beams 24 and 26 in FIG. 1. As in the embodiment of FIG. 2a, analyzer 280 is oriented to mix the polarizations of the reference and measurement beams and produce the output beams. For example, analyzer 280 can be a polarizing beam-splitter oriented so that the plane of incidence of combined beam 273 is substantially at an angle (e.g., 45 degrees) with respect to the plane of FIG. 2b. Referring to Eq. 1, HSPMI 264 is an example of a double-pass interferometer having p=2.

In yet further embodiments, interferometer 14 can involve multiple measurement beams providing multiple axes of measurement, combinations of which can be used to determine changes in the angular orientation of the measurement object. Other embodiments of the interferometer can include a differential plane mirror interferometer and/or a similar device such as described in an article entitled "Differential interferometer arrangements for distance and angle measurements: Principles, advantages and applications" by C. Zanoni, *VDI Berichte* Nr. 749, 93–106 (1989), the contents of which is incorporated herein by reference. Further embodiments of the interferometer also include those having a dynamic beam steering element or passive zero shear interferometers. For example, interferometers including a dynamic beam steering element are described in commonly owned U.S. Pat. Nos. 6,252,667, 6,271,923, and 6,313,876 by Henry Allen Hill, the contents of which are incorporated herein by reference. Passive zero shear interferometers are described in commonly owned U.S. Provisional Patent Applications Serial No. 60/309,608, entitled "Passive Zero Shear Interferometers" and filed Aug. 2, 2001, and Serial No. 60/314,345, entitled "Passive Zero Shear Interferometers using Angle Sensitive Beam Splitters" and filed Aug. 23, 2001, both by Henry Allen Hill, the contents of which are incorporated herein by reference.

In further embodiments, different components and/or arrangements can be used to generate the output beams. For example, rather than having polarization analyzer 230 and 280 in FIGS. 2a and 2b, respectively, be oriented at so that the plane of incidence of the combined beam is substantially at 45 degrees with respect to the plane of the Figure, a half plate retardation plate can be positioned to rotate the linear polarization of the reference and measurement beam components of the combined beam by 45 degrees prior to the analyzer, which can now be oriented so that the plane of incidence is normal to the plane of the Figure (in which case the output beams propagate within the plane of the Figure). Such an embodiment is shown in FIG. 2c, with half wave plate 290 and polarizing beam splitter 291 (acting as the analyzer) producing the output beams 293 and 294 from the combined beam 292.

Moreover, in other embodiments such as that in FIG. 2d, the analyzer can be replaced with a non-polarizing beam splitter 291' and a separate pair of polarizers 295 and 296. The non-polarizing beam splitter separates combined beam 292 into two beams 297a and 297b, which each include reference and measurement beam components, and then polarizers 295 and 296 are positioned to receive beams 297a and 297b, respectively, and mix the reference and measurement beam components therein to produce output beams 298 and 299, respectively.

In yet further embodiments, the measurement and reference beams themselves can each be separated into two portions, and then each pair of reference and measurement beam portions can be combined and have the polarizations of its components mixed to produce a corresponding output beam.

As described in FIG. 1, the measured intensities of the output beams are processed by electronic processor 20. An exemplary embodiment of processor 20 is shown in FIG. 3 and includes high band pass filter 318 to select heterodyne frequency $f_1$ components from the intensity signals $I_1$ and $I_2$ and suppress other frequency components. The signals $s_1$ and $s_2$ produced by high band pass filter 318 are then multiplied to together by processor 320 to produce superheterodyne signal $[s_1 \times s_2]$. A second high band pass filter 322 receives the superheterodyne signal and filters it to retain components at the superheterodyne frequency $2f_1$ and suppress other components (such as those at the heterodyne frequency $f_1$. A phase meter 324 then extracts the phase $\phi_1$ of the superheterodyne term, and a subsequent processor component 326 converts that phase into information related to the measurement and reference beams in the interferometer (e.g., a change in optical distance or a change in propagation direction of an input beam). Suitable digital and/or analog electronic components for each of these functions are well known in the electronic arts.

The mathematical operations performed on the intensity signals from the output beams by the electronic processor are now described.

In the absence of any non-linear contributions to signals $s_1$ and $s_2$, such as cyclic errors, the measured phases of filtered signals $s_1$ and $s_2$ are equal to phase $\phi_1$ plus phase offsets that are independent of $\phi_1$ (or equivalently, independent of changes in the optical path length difference between the reference and measurement beams in the interferometer). However, interferometers generally have cyclic error contributions to the measured phases caused by beam mixing, multiple reflections, and imperfections in optics. Filtered signals $s_1$ and $s_2$ can be written, respectively, as $$s_1 = g_1 \begin{bmatrix} 2|E_1||E_2|\cos\vartheta_1\cos\vartheta_2\cos(\omega_1 t + \varphi_1 + \zeta_1) + \\ \sum_j \cos\vartheta_1 \cos\vartheta_{1\varepsilon,j}[E_1\varepsilon^*_{1,j} + E^*_1\varepsilon_{1,j}]_1 + \\ \sum_j F_{2,j}\cos\vartheta_1\cos\vartheta_{2\varepsilon,j}[E_1\varepsilon^*_{2,j} + E^*_1\varepsilon_{2,j}]_1 + \\ \sum_j F_{1,j}\cos\vartheta_2\cos\vartheta_{1\varepsilon,j}[E_2\varepsilon^*_{1,j} + E^*_2\varepsilon_{1,j}]_1 + \\ \sum_j \cos\vartheta_2\cos\vartheta_{2\varepsilon,j}[E_2\varepsilon^*_{2,j} + E^*_2\varepsilon_{2,j}]_1 + \\ \sum_{i,j} O(\varepsilon_{1,i}\varepsilon_{2,j}) \end{bmatrix},\qquad(2)$$

-continued $$s_2 = g_2 \begin{bmatrix} 2|E_1||E_2|\sin\vartheta_1\sin\vartheta_2\cos(\omega_1 t + \varphi_1 + \zeta_2) + \\ \sum_j \sin\vartheta_1\sin\vartheta_{1\varepsilon,j}[E_1\varepsilon_{1,j}^* + E_1^*\varepsilon_{1,j}]_2 + \\ \sum_j F_{2,j}\sin\vartheta_1\sin\vartheta_{2\varepsilon,j}[E_1\varepsilon_{2,j}^* + E_1^*\varepsilon_{2,j}]_2 + \\ \sum_j F_{1,j}\sin\vartheta_2\sin\vartheta_{1\varepsilon,j}[E_2\varepsilon_{1,j}^* + E_2^*\varepsilon_{1,j}]_2 + \\ \sum_j \sin\vartheta_2\sin\vartheta_{2\varepsilon,j}[E_2\varepsilon_{2,j}^* + E_2^*\varepsilon_{2,j}]_2 + \\ \sum_{i,j} O(\varepsilon_{1,i}\varepsilon_{2,j}) \end{bmatrix}$$  (3)

where $g_1$ and $g_2$ are the detector sensitivities and amplifier gains for detectors 16 and 18, respectively; $E_1$ and $E_2$ are the complex amplitudes of primary electric fields, i.e., non-spurious electric fields, of the measurement and reference beams, respectively; $\varepsilon_{1,j}$ and $\varepsilon_{2,j}$ are complex electric field amplitudes of spurious beam components of the measurement and reference beams, respectively, that produce cyclic error terms in the measured phases of filtered signals $s_1$ and $s_2$, wherein j is an index (to denote multiple spurious beam components); $\zeta_1$ and $\zeta_2$ are phase offsets that are independent of $\phi_1$; and $F_{1,j}$ and $F_{2,j}$ are the amplitude reduction factors experienced by respective cyclic error terms associated with $\varepsilon_{1,j}$ and $\varepsilon_{2,j}$, respectively, in signals $s_1$ and $s_2$ as a result of the filtering by high pass filter 318. The term $o(\varepsilon_{1,i}\varepsilon_{2,j})$ in Eqs. (2) and (3) denotes a term that is second order in a combination of $\varepsilon_{1,i}$ and $\varepsilon_{2,j}$. Angles $\Theta_1$ and $\Theta_2$ are the angles between the plane of incidence of the combined beam at the analyzer and the planes of polarization of the non-spurious measurement and reference beam components of the combined beam, respectively. Angles $\Theta_{1\varepsilon,j}$ and $\Theta_{2\varepsilon,j}$ are the angles between the plane of incidence of the combined beam at the analyzer and the planes of polarization of the spurious measurement and reference beam components of the combined beam, respectively, for the j-th spurious beam. The frequency $\omega_1$ corresponds to the heterodyne frequency according to $\omega_1 = f_1/2\pi$.

Typically, the spurious beam components corresponding to $\varepsilon_{1,j}$ are components that have the same frequency as that of the primary reference component $E_2$, but become collinear with the primary measurement beam component through spurious polarization mixing. Conversely, the spurious beam components corresponding to $\varepsilon_{2,j}$ are components that have the same frequency as that of the primary measurement component $E_1$, but become collinear with the primary reference beam component through spurious polarization mixing. Thus, the relative phases of $\varepsilon_{1,j}$ and $E_1$ comprise a $\omega_1 t$ term, the relative phases of $\varepsilon_{2,j}$ and $E_2$ comprise a $\omega_1 t$ term, and the relative phases of $E_1$ and $E_2$ comprise a $\omega_1 t$ term. However, the relative phases of $\varepsilon_{1,j}$ and $E_2$ do not comprise a $\omega_1 t$ term and the relative phases of $\varepsilon_{2,j}$ and $E_1$ do not comprise a $\omega_1 t$ term. Primary sources of such $\varepsilon_{1,j}$ and $\varepsilon_{2,j}$ terms are for example mixing with respect to polarization of the two frequency components in the light source and finite values for the extinction coefficients of the polarization beam-splitter(s) in the interferometer.

Moreover, the polarizations of the spurious beams components corresponding to $\varepsilon_{1,j}$ typically are the same as that of the primary measurement beam component corresponding to $E_1$ and the polarizations of the spurious beams components corresponding to $\varepsilon_{2,j}$ typically are the same as that of the primary measurement beam component corresponding to $E_2$ because of the polarizing beam splitter in the interferometer. As described above, the polarization purity of the measurement and reference beams can be further enhanced by using multiple polarizers. As a result, one typically obtains the condition that $\Theta_{1\varepsilon,j} = \Theta_1$ and $\Theta_{2\varepsilon,j} = \Theta_2$.

Note also that the expressions in the square brackets in each of the summations in Eqs. (2) and (3) include a subscript to denote whether they correspond to the first or second output beam. This distinction corresponds to any phase offsets terms introduced into the intensity signals by the different detectors. Otherwise, these terms are identical because each output beam is derived from the same primary reference and measurement beams in the interferometer. Typically, this phase-offset difference between the otherwise identical terms in these square brackets is small.

Multiplication of the signals $s_1$ and $s_2$ generates the superheterodyne signal $[s_1 \times s_2]$:

$$[s_1 \times s_2] = \left(\frac{1}{2}\right) g_1 g_2 \times \begin{bmatrix} |E_1|^2|E_2|^2\sin 2\vartheta_1\sin 2\vartheta_2\cos(2\omega_1 t + 2\varphi_1 + \zeta_1 + \zeta_2) + \\ \sum_j \sin 2\vartheta_1 \left\{ \begin{array}{l} \sin\vartheta_2\cos\vartheta_{1\varepsilon,j}[E_1\varepsilon_{1,j}^* + E_1^*\varepsilon_{1,j}]_1[E_1E_2^* + E_1^*E_2]_2 + \\ \cos\vartheta_2\sin\vartheta_{1\varepsilon,j}[E_1\varepsilon_{1,j}^* + E_1^*\varepsilon_{1,j}]_2[E_1E_2^* + E_1^*E_2]_1 \end{array} \right\} + \\ \sum_j F_{2,j}\sin 2\vartheta_1 \left\{ \begin{array}{l} \sin\vartheta_2\cos\vartheta_{2\varepsilon,j}[E_1\varepsilon_{2,j}^* + E_1^*\varepsilon_{2,j}]_1[E_1E_2^* + E_1^*E_2]_2 + \\ \cos\vartheta_2\sin\vartheta_{2\varepsilon,j}[E_1\varepsilon_{2,j}^* + E_1^*\varepsilon_{2,j}]_2[E_1E_2^* + E_1^*E_2]_1 \end{array} \right\} + \\ \sum_j F_{1,j}\sin 2\vartheta_2 \left\{ \begin{array}{l} \sin\vartheta_1\cos\vartheta_{1\varepsilon,j}[E_2\varepsilon_{1,j}^* + E_2^*\varepsilon_{1,j}]_1[E_1E_2^* + E_1^*E_2]_2 + \\ \cos\vartheta_1\sin\vartheta_{1\varepsilon,j}[E_2\varepsilon_{1,j}^* + E_2^*\varepsilon_{1,j}]_2[E_1E_2^* + E_1^*E_2]_1 \end{array} \right\} + \\ \sum_j \sin 2\vartheta_2 \left\{ \begin{array}{l} \sin\vartheta_1\cos\vartheta_{2\varepsilon,j}[E_2\varepsilon_{2,j}^* + E_2^*\varepsilon_{2,j}]_1[E_1E_2^* + E_1^*E_2]_2 + \\ \cos\vartheta_1\sin\vartheta_{2\varepsilon,j}[E_2\varepsilon_{2,j}^* + E_2^*\varepsilon_{2,j}]_2[E_1E_2^* + E_1^*E_2]_1 \end{array} \right\} + \\ \sum_{i,j} O(\varepsilon_{1,i}\varepsilon_{2,j}) \end{bmatrix}$$  (4)

Notably, the terms that are first order in $\varepsilon_{1,j}$ and $\varepsilon_{2,j}$ and belong to the first and fourth summations in Eq. (4) can be simplified under the condition that $\Theta_2$ and $\Theta_{1\varepsilon}$ are complimentary angles and $\Theta_1$ and $\Theta_{2\varepsilon}$ are complimentary angles, that is:

$\Theta_{1\varepsilon} + \Theta_2 = \pi$,  (5)

$\Theta_{2\varepsilon} + \Theta_1 = \pi$.  (6)

When the complimentary conditions expressed by Eqs. (5) and (6) are satisfied, Eq. (4) reduces to $$[s_1 \times s_2] = \left(\frac{1}{2}\right) g_1 g_2 \times \begin{bmatrix} |E_1|^2 |E_2|^2 \sin 2\vartheta_1 \sin 2\vartheta_2 \cos(2\omega_1 t + 2\varphi_1 + \zeta_1 + \zeta_2) + \\ \sum_j \sin 2\vartheta_1 \sin \vartheta_2 \cos \vartheta_{1\varepsilon,j} \left\{ \begin{array}{l} [E_1\varepsilon_{1,j}^* + E_1^*\varepsilon_{1,j}]_1 [E_1 E_2^* + E_1^* E_2]_2 - \\ [E_1\varepsilon_{1,j}^* + E_1^*\varepsilon_{1,j}]_2 [E_1 E_2^* + E_1^* E_2]_1 \end{array} \right\} + \\ \sum_j F_{2,j} \sin 2\vartheta_1 \left\{ \begin{array}{l} \sin \vartheta_2 \cos \vartheta_{2\varepsilon,j} [E_1\varepsilon_{2,j}^* + E_1^*\varepsilon_{2,j}]_1 [E_1 E_2^* + E_1^* E_2]_2 + \\ \cos \vartheta_2 \sin \vartheta_{2\varepsilon,j} [E_1\varepsilon_{2,j}^* + E_1^*\varepsilon_{2,j}]_2 [E_1 E_2^* + E_1^* E_2]_1 \end{array} \right\} + \\ \sum_j F_{1,j} \sin 2\vartheta_2 \left\{ \begin{array}{l} \sin \vartheta_1 \cos \vartheta_{1\varepsilon,j} [E_2\varepsilon_{1,j}^* + E_2^*\varepsilon_{1,j}]_1 [E_1 E_2^* + E_1^* E_2]_2 + \\ \cos \vartheta_1 \sin \vartheta_{1\varepsilon,j} [E_2\varepsilon_{1,j}^* + E_2^*\varepsilon_{1,j}]_2 [E_1 E_2^* + E_1^* E_2]_1 \end{array} \right\} + \\ \sum_j \sin 2\vartheta_2 \sin \vartheta_1 \cos \vartheta_{2\varepsilon,j} \left\{ \begin{array}{l} [E_2\varepsilon_{2,j}^* + E_2^*\varepsilon_{2,j}]_1 [E_1 E_2^* + E_1^* E_2]_2 - \\ [E_2\varepsilon_{2,j}^* + E_2^*\varepsilon_{2,j}]_2 [E_1 E_2^* + E_1^* E_2]_1 \end{array} \right\} + \\ \sum_{i,j} O(\varepsilon_{1,i}\varepsilon_{2,j}) \end{bmatrix} \quad (7)$$

Furthermore, the $[E_1\epsilon^*_{1,j}+E^*_1\epsilon_{1,j}]_1[E_1E^*_2+E^*_1E_2]_2$ term cancels the $[E_1\epsilon^*_{1,j}+E^*_1\epsilon_{1,j}]_2[E_1E^*_2+E^*_1E_2]_1$ term, and likewise the $[E_1\epsilon^*_{2,j}+E^*_1\epsilon_{2,j}]_1[E_1E^*_2+E^*_1E_2]_2$ term cancels the $[E_1\epsilon^*_{2,j}+E^*_1\epsilon_{2,j}]_2[E_1E^*_2+E^*_1E_2]_1$ term, because any phase offset introduced by the different detectors will be present in each of the terms. Consequently, Eq. (7) may be written as $$[s_1 \times s_2] = \left(\frac{1}{2}\right) g_1 g_2 \begin{bmatrix} |E_1|^2 |E_2|^2 \sin 2\vartheta_1 \sin 2\vartheta_2 \cos(2\omega_1 t + 2\varphi_1 + \zeta_1 + \zeta_2) + \\ \sum_j F_{2,j} \sin 2\vartheta_1 \left\{ \begin{array}{l} \sin \vartheta_2 \cos \vartheta_{2\varepsilon,j} [E_1\varepsilon_{2,j}^* + E_1^*\varepsilon_{2,j}]_1 [E_1 E_2^* + E_1^* E_2]_2 + \\ \cos \vartheta_2 \sin \vartheta_{2\varepsilon,j} [E_1\varepsilon_{2,j}^* + E_1^*\varepsilon_{2,j}]_2 [E_1 E_2^* + E_1^* E_2]_1 \end{array} \right\} + \\ \sum_j F_{1,j} \sin 2\vartheta_2 \left\{ \begin{array}{l} \sin \vartheta_1 \cos \vartheta_{1\varepsilon,j} [E_2\varepsilon_{1,j}^* + E_2^*\varepsilon_{1,j}]_1 [E_1 E_2^* + E_1^* E_2]_2 + \\ \cos \vartheta_1 \sin \vartheta_{1\varepsilon,j} [E_2\varepsilon_{1,j}^* + E_2^*\varepsilon_{1,j}]_2 [E_1 E_2^* + E_1^* E_2]_1 \end{array} \right\} + \\ \sum_{i,j} O(\varepsilon_{1,i}\varepsilon_{2,j}) \end{bmatrix} \quad (8)$$

which shows the elimination of the cyclic error terms of the first and fourth summations in Eq. (4).

The complimentary conditions expressed by Eqs. (5) and (6) can be easily achieved with high accuracy, e.g. 0.001 radians, by adjusting for example the orientation of the analyzer used to generate the output beams. A non-limiting example of angles meeting the complimentary conditions is $\Theta_1=\Theta_{1\epsilon,j}=45°$ and $\Theta_2=\Theta_{2\epsilon,j}=135°$. The complimentary conditions are met to a certain level of accuracy as a result of polarization filtering experienced by the measurement and reference beams in the interferometer by the polarizating beam-splitter. As described above, a higher level of accuracy may be achieved in meeting the complimentary conditions by inserting additional stages of polarization filtering.

The complimentary conditions do not lead to a reduction in effectiveness for generation of cyclic error terms that are first order in $\epsilon_{1,j}$ and $\epsilon_{2,j}$ and that belong to the second and third summations in Eq. (4). However, the effectiveness of these terms is generally reduced as a result of the frequency spectrum of these terms as reflected by the factors $F_{1,j}$ and $F_{2,j}$ that are present in Eqs. (4), (7), and (8).

Moreover, what remains of these terms in the superheterodyne signal of Eq. (8) have phases that have a contribution linear $\omega_1 t$ compared to the $2\omega_1 t$ dependence of the primary term in Eq. (8), and thus these remaining spurious first-order terms can be further reduced by second high band pass filter 322. Following such filtering, the phase $\phi_1$ of the superheterodyne signal is extracted by phase meter 324. In distance measuring applications, processor component 326 then determines changes in path length $L_1$ from $\phi_1$ according to Eq. (1). The application of processor component 326 for angle measuring applications is discussed further below.

Accordingly, as a result of generating a product term derived from the two output beams and subsequent processing of that product term, first-order cyclic error contributions to the interferometric distance and/or angle measurement can be eliminated. The cyclic errors can arise from secondary beam contaminations that may occur in both the source of the input beam and in the interferometer, and also birefringence in optical components of an interferometer. Moreover, effects of rotation of the plane of polarization by birefringence can be further compensated by embodiments involving multiple stages of polarization filtering. The limiting magnitude of the residual cyclic errors after the cyclic error compensation described herein is second order in $|\epsilon_{1,j}|$ and/or $|\epsilon_{2,j}|$. For example, a cyclic error term that leads to an error in a linear displacement with an amplitude of 1 nm will have the limiting cyclic error amplitude of the order of 1 pm.

Notably, the compensation of the cyclic errors can be achieved without an increase in the intensity of the input beam. Furthermore, the compensation for the cyclic errors can be achieved using only a single phase meter, thereby reducing cost. Moreover, because of the generation of the superheterodyne signal there is an increase in phase resolution by a factor of 2 as shown in Eq. (4). Another important feature of the cyclic error compensation is that it is independent of the sensitivity-gain parameters $g_1$ and $g_2$. Therefore, it is not necessary to carefully balance the detector electronics that measure the intensities of the output beams.

In another embodiment, interferometer 14 in FIG. 1 can be an angle measuring interferometer. FIG. 4a shows a schematic diagram of an angle measuring interferometer 400. A source (not shown) directs an input beam 402 having two orthogonally polarized components having a difference in frequency equal to $f_1$ to a beam shearing assembly 410 at an incident angle $\theta_{input}$ (which is typically small). The beam shearing assembly separates the input beam into two components having the orthogonal polarizations (e.g., measurement and reference beams) and causes the components to emerge as parallel propagating beams 412 and 413 corresponding to each of the orthogonally polarized components and having a traverse separation (i.e., shear) of $S_3$. As shown in FIG. 4a, the beam 412 is a linear polarization parallel to the plane of the Figure, and beam 413 has a linear polarization orthogonal to the plane of the Figure. The size of the shear $S_3$ and the relative optical path length between the two components in the beam shearing assembly will vary with the incident angle $\theta_{input}$. Beams 412 and 413 are then incident on analyzer 420, which is similar to the analyzers in the embodiments described above involving a distance measuring interferometer.

A first common polarization component of each of the sheared beams 412 and 413 is transmitted by analyzer 420 as components 422 and 423, respectively, and a second common polarization component of each of the sheared beam 412 and 413 are reflected by analyzer 420 as components 432 and 433, respectively. For example, in the embodiment shown in FIG. 4a, analyzer 420 is a polarizing beam-splitter oriented so that the plane of incidence of beams 412 and 413 are substantially at an angle of 45 degrees with respect to the plane of FIG. 4a. As a result, beams 432 and 433 are propagating substantially at angles of 45 degrees with respect to the plane of FIG. 4a.

Next, beams 422 and 423 (corresponding to the first common polarization) are incident on lens 424, which focuses them to overlap and define a first output beam 425. Referring now to FIG. 4b (which is in a plane at 45 degrees to that of FIG. 4a), beams 432 and 433 (corresponding to the second common polarization) are incident on lens 434, which focuses them to overlap and define a second output beam 435. The first and second output beams 425 and 435 correspond to output beams 24 and 26 in FIG. 1, whose intensities are measured by detectors 16 and 18, respectively.

As described above in connection with distance measuring applications, additional angle-measuring embodiments may implement different components and/or arrangements to generate the output beams. For example, a half-wave retardation plate can be positioned to receive sheared beams 412 and 413 prior to their being incident on polarization analyzer 420, in which case the orientation of analyzer 420 may be modified similar to what was described above with reference to FIG. 2c. Moreover, in other embodiments the analyzer can be replaced with a non-polarizing beam splitter and a separate pair of polarizers as described above with reference to FIG. 2d.

The intensities of output beams 425 and 435 are then processed by electronic processor 20 as described above, resulting in a reduction (or even an elimination) of first-order cyclic errors in the interferometric measurement. In the presently described embodiment, the phase of the superheterodyne signal derived from output beams 425 and 435 corresponds to the relative optical path length difference of the beams in the beam shearing assembly, which in turn can be related to the incident angle of the input beam.

We now describe a particular embodiment for beam shearing assembly 410, the resulting mathematics for the intensity signal of the output beams, and the extraction of the input angle information.

Figure 5A:
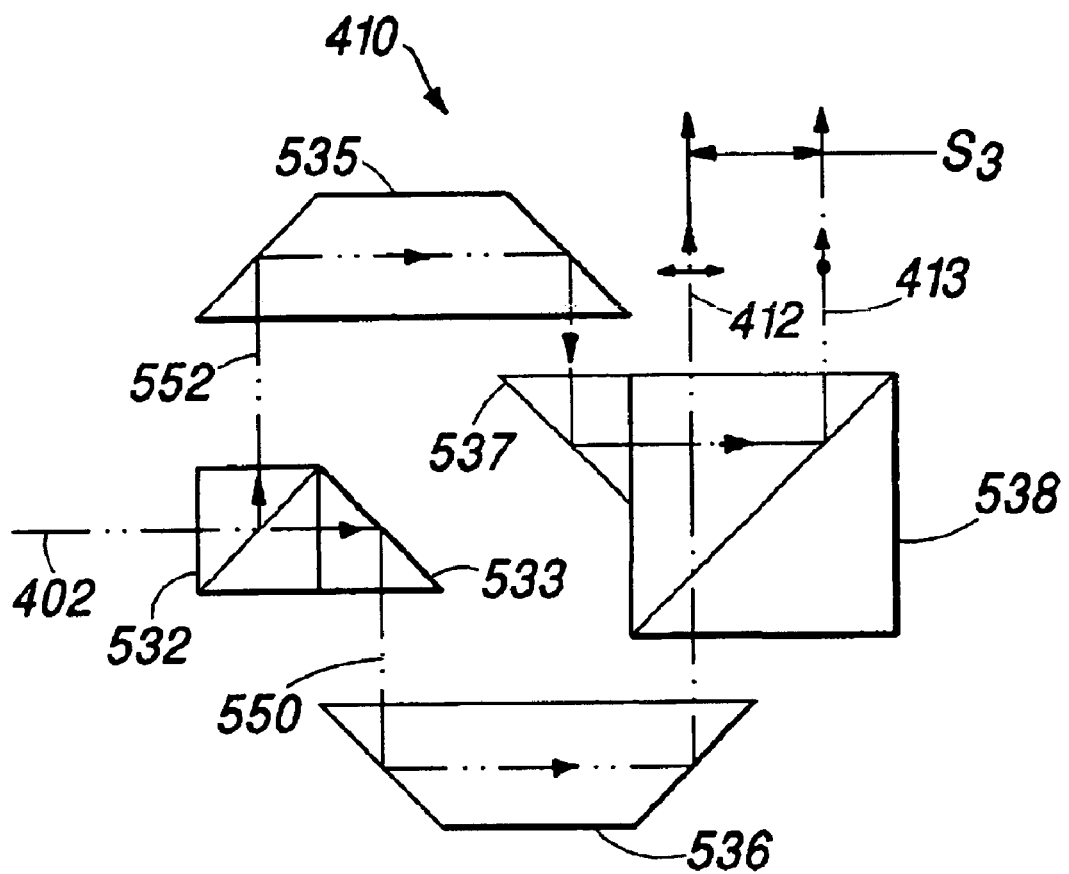
FIG. 5a is a schematic diagram of one embodiment of a beam shearing assembly for use with the angle measuring interferometer of FIGS. 4a and 4b.

Referring to FIG. 5a, in one embodiment beam shearing assembly 410 includes comprises polarizing beam-splitters 532 and 538, right angle prisms 533 and 537, and truncated Porro prisms 535 and 536. The component of input beam 402 polarized in the plane of FIG. 5a (referred to hereinafter as beam 550) is transmitted by polarizing beam-splitter 532, reflected by right angle prism 533, redirected by truncated Porro prism 536, and reflected by polarizing beam-splitter 538 as beam 412. The component of input beam 402 polarized orthogonal to the plane of FIG. 5a (referred to hereinafter as beam 552) is reflected by polarizing beam-splitter 532, redirected by truncated Porro prism 535, reflected by right angle prism 537, and transmitted by polarizing beam-splitter 538 as beam 413.

Note that in the presently described embodiment, the optical path in glass for each of the two beams through beam-shearing assembly 410 and analyzer 410 is the same. This feature produces a high stability interferometer system with respect to changes in temperature.

The heterodyne intensity signal corresponding to output beams 425 and 435 is given by $s_3$ and $s_4$, respectively, following the filtering by the first high band pass filter in the electronic processor. For the case where there are no cyclic errors, the filtered interference signals $s_3$ and $s_4$ may be written as $$s_3 = A_3 \cos(\omega_1 t + \phi_3 + \zeta_3), \quad (9)$$

$$s_4 = A_4 \cos(\omega_1 t + \phi_3 + \zeta_4) \quad (10)$$

where $$\phi_3 = 2k_1 n[d_1 \cos\theta'_1 + d_2 \cos\theta'_2 - d_3 \cos\theta'_3 - d_4 \cos\theta'_4], \quad (11)$$

$\omega_1 = 2\pi f_1$, $\zeta_3$ and $\zeta_4$ are offset phases not associated with phase $\phi_3$, $k_1 = 2\pi/\lambda_1$, $\lambda_1$ is the wave length of the input beam, $\theta'_1$ and $\theta'_2$ are angles of incidence of beam 550 at right angle prism 533 and at the polarizing beam-splitter 538, respectively, (see FIG. 5b), $\theta'_3$ and $\theta'_4$ are angles of incidence of beam 552 at polarizing beam-splitter 532 and at right angle prism 537, respectively, (see FIG. 5b), and $d_1$, $d_2$, $d_3$, and $d_4$ are defined in FIG. 5b. It has been assumed in Eq. (11) for the purposes of demonstrating the features of the present invention in a simple fashion without departing from the scope and spirit of the present invention that all of the optical paths in beam-shearing assembly 410 have the same index of refraction. In a non-limiting example, the beam shearing assembly is constructed to satisfy $d_1 = d_3$, $d_2 = d_4$, $\theta'_1 + \theta'_2 = \pi/2$, and $\theta'_3 + \theta'_4 = \pi/2$, in which case Eq.(11) reduces to the simpler expression for $\Phi_3$, $$\varphi_3 = 2^{1/2} k_1 n \begin{bmatrix} (d_1 - d_2)[\cos(\theta'_1 + \pi/4) + \cos(\theta'_4 + \pi/4)] + \\ (d_1 - d_2)[\sin(\theta'_1 + \pi/4) - \sin(\theta'_4 + \pi/4)] \end{bmatrix}. \quad (12)$$

As in the distance measuring embodiments described above, the filtered electrical interference signals $s_3$ and $s_4$ are next multiplied within the electronic processor to produce superheterodyne signal $[s_3 \times s_4]$. Superheterodyne signal $[s_3 \times s_4]$ is then filtered by the second high band pass filter and transmitted to the phase meter. The phase meter then determines the phase of superheterodyne signal $[s_3 \times s_4]$, which is equal to $2\Phi_3$ and which has a substantially reduced contribution from first-order cyclic errors. The phase $2\Phi_3$ is converted to a corresponding change in the input angle $d\theta_{input}$ using Eq. (11) (because the angles $\theta'_1$, $\theta'_2$, $\theta'_3$ and $\theta'_4$ vary according to the input angle) or an appropriate form of Eq. (11). The description of the compensation for cyclic errors and the enhancement of phase resolution by a factor of 2 is the same as that described above. For an example of a cyclic error term that leads to an error in an angular displacement with an amplitude of 200 nano-radians, the limiting cyclic error amplitude will be of the order of 0.2 nano-radians.

Lateral shear $S_3$ is related to properties of beam-shearing assembly 130 according to the equation $$S_3 = 2\begin{bmatrix} (d_1 \sin\theta'_1 - d_2 \sin\theta'_2)\sec\phi'_1 \cos\phi_1 + \\ (d_3 \sin\theta'_3 - d_4 \sin\theta'_4)\sec\phi'_3 \cos\phi_3 \end{bmatrix} \quad (13)$$

where $\phi_1$ and $\phi'_1$ are the angles of incidence and refraction of beam component 550 of the input beam at entrance facet of polarizing beam-splitter 532 and $\phi_3$ and $\phi'_3$ are the angles of incidence and refraction of beam component 552 of the input beam at entrance facet of polarizing beam-splitter 532 (see FIG. 5b). For the non-limiting example above for the beam shearing assembly, Eq. (13) simplifies to $$S_3 = 2^{1/2} \left\{ (d_1 - d_2)\begin{bmatrix} \sin(\theta'_1 + \pi/2)\sec\phi'_1\cos\phi_1 + \\ \sin(\theta'_4 + \pi/2)\sec\phi'_3\cos\phi_3 \end{bmatrix} + (d_1 + d_2)\begin{bmatrix} \sin(\theta'_1 - \pi/2)\sec\phi'_1\cos\phi_1 - \\ \sin(\theta'_4 - \pi/2)\sec\phi'_3\cos\phi_3 \end{bmatrix} \right\} \quad (14)$$

The expression given for $S_3$ by Eqs. (13) and (14) represent the primary mechanism used for generation of the beam shear. However, there are other mechanisms for introducing a beam shear such as associated with angle of incidence dependent phase shifts (Goos-Hänchen effect).

Figure 5D:
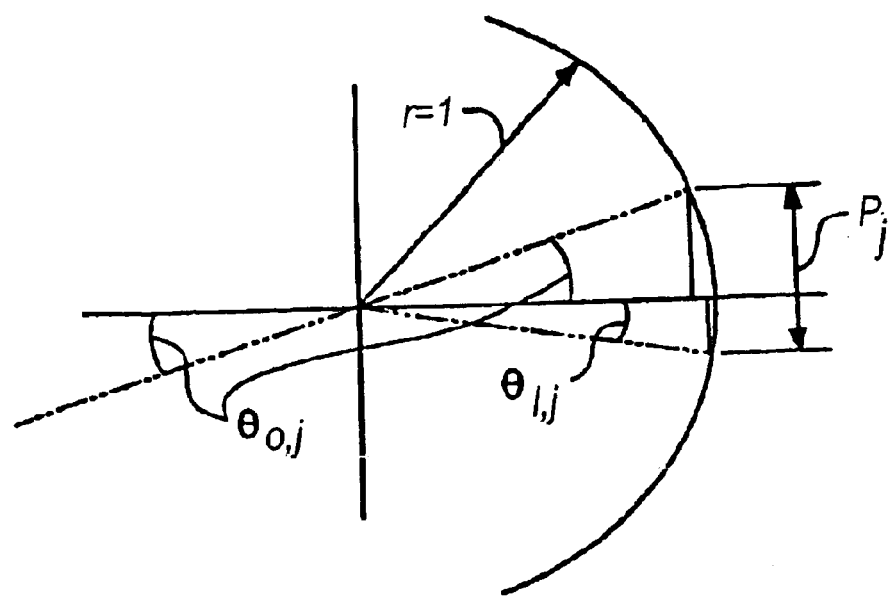

Amplitude $A_3$ (and similarly amplitude $A_4$) is proportional to a good approximation to a Fourier component of the Fourier transform of $|h(p_3)|^2$, i.e., $$A_3 \propto \int |h(p_3)|^2 \cos[4k_1 p_3 S_3] dp_3 \quad (15)$$

where $h(p_3)$ is the Fourier transform of the amplitude of one of the beams 422 or 423 at lens 424 multiplied by the pupil function of lens 424, $$p_j = \sin\theta_{o,j} + \sin\theta_{i,j}, j=1,2,\ldots, \quad (16)$$

and the definition of $\theta_{o,j}$ and $\theta_{i,j}$ are shown in FIG. 5c. Angles $\theta_{o,j}$ and $\theta_{i,j}$ are conjugate angles of principle rays of beam j in the object and image space of lens 424. The definition of $p_j$ is shown in FIG. 5d.

It is evident from Eqs. (11) and (12) that the resolution of phase $\Phi_3$ in terms of a change in a direction of an optical beam is increased as the length $2^{3/2}(d_1-d_2)$ is increased. However, the usable range for $2^{3/2}(d_1-d_2)$ is defined by the spatial frequency bandwidth of the Fourier transform of $|h(p_3)|^2$ as shown by Eq. (15).

The optimum value for $2^{3/2}(d_1-d_2)$ is generally equal to approximately one half a characteristic spatial dimension of a beam transmitted by a respective pupil. Consider, for example, the case of a rectangle pupil of dimension b in the plane of FIG. 5a for both beam 422 and beam 423 at lens 424 and the amplitudes of beams 422 and 423 being uniform across respective pupils. For this case, $|h(p_3)|^2$ is a sinc function squared, i.e. $(\sin x/x)^2$, and the Fourier transform of $|h(p_3)|^2$ is a triangle function $\Lambda$. Triangle function $\Lambda$ has a maximum value of 1 for $2^{3/2}(d_1-d_2)=0$ and has a value of 0 for $2^{3/2}(d_1-d_2) \geq b$. Therefore, amplitude $A_3=0$ for $2^{3/2}(d_1-d_2) \geq b$ and the resolution of phase $\Phi_3$ in terms of a change in a direction of an optical beam is 0 for $2^{3/2}(d_1-d_2)=0$. Thus the optimum value for $2^{3/2}(d_1-d_2)$ is in this case approximately b/2. The actual optimum value for $2^{3/2}(d_1-d_2)$ will depend on the criterion used to define an optimum operating condition with respect to a signal-to-noise ratio, for example. For the case where the components of input beam 402 have Gaussian intensity profiles, the optimum value for $2^{3/2}(d_1-d_2)$ will be approximately w where w is the radius at which the intensity of input beam 402 has a value equal to 1/e of the intensity at beam 402 at its center.

For an example of a beam having a Gaussian intensity profile with 2w=5.0 mm, $\theta_1$=45 degrees, and $\lambda_1$=633 nm, the sensitivity of the phase $2\Phi_3$ to changes in $d\phi_1$ and $d\phi_3$ based on Eq. (12) can be expressed in differential form as given by the equation $$d\varphi_3 = 2k_1 w\left[\frac{d\phi_1 + d\phi_3}{2}\right] \quad (17)$$
$$= -5.0 \times 10^4 \left[\frac{d\phi_1 + d\phi_3}{2}\right].$$

Note that Eq. (17) generalizes the situation to include cases where the orthogonally polarized components of the input beam are not collinear, otherwise Eq. (17) can be simplified further according to $d\theta_{input}=d\phi_1=d\phi_3$. Note also that Eq. (17) shows that the sensitivity of the change in phase $\phi_3$ with respect to changes in angles $d\phi_1$ and $d\phi_3$ is independent of the index of refraction n. This is an important property. In particular, the sensitivity of the change in phase $\Phi_3$ with respect to changes in angles $d\phi_1$ and $d\phi_3$ has a sensitivity to temperature changes that is independent in first order to thermal induced changes in the refractive index of the optical elements of the beam-shearing assembly and only dependent on thermal coefficients of expansion of the optical elements of the beam-shearing assembly. The thermal coefficients of the elements of beam-shearing assembly 410 can generally be selected to be less than $\leq 0.5$ ppm/degC. For similar reasons, the zero value of $\Phi_3$ also exhibits a corresponding low sensitivity to changes in temperature of the beam-shearing assembly.

The two primary quantities that place restrictions on the range of average value $[d\phi_1+d\phi_3]/2$ that can be accommodated by the first embodiment are the magnitude of the difference $[d\phi_1-d\phi_3]/2$ and the size of the sensitive area of the detector(s). The amplitudes of signals $s_3$ and $s_4$ will be reduced by a factor of approximately 2 when $$wk_1\left[\frac{[d\phi_1 - d\phi_3]}{2}\right] \approx 1.$$

The higher terms in $d\phi_1$ and $d\phi_3$ that are omitted in Eq. (17) can be easily determined from Eq. (11) if required for a particular end use application.

Figure 5E:
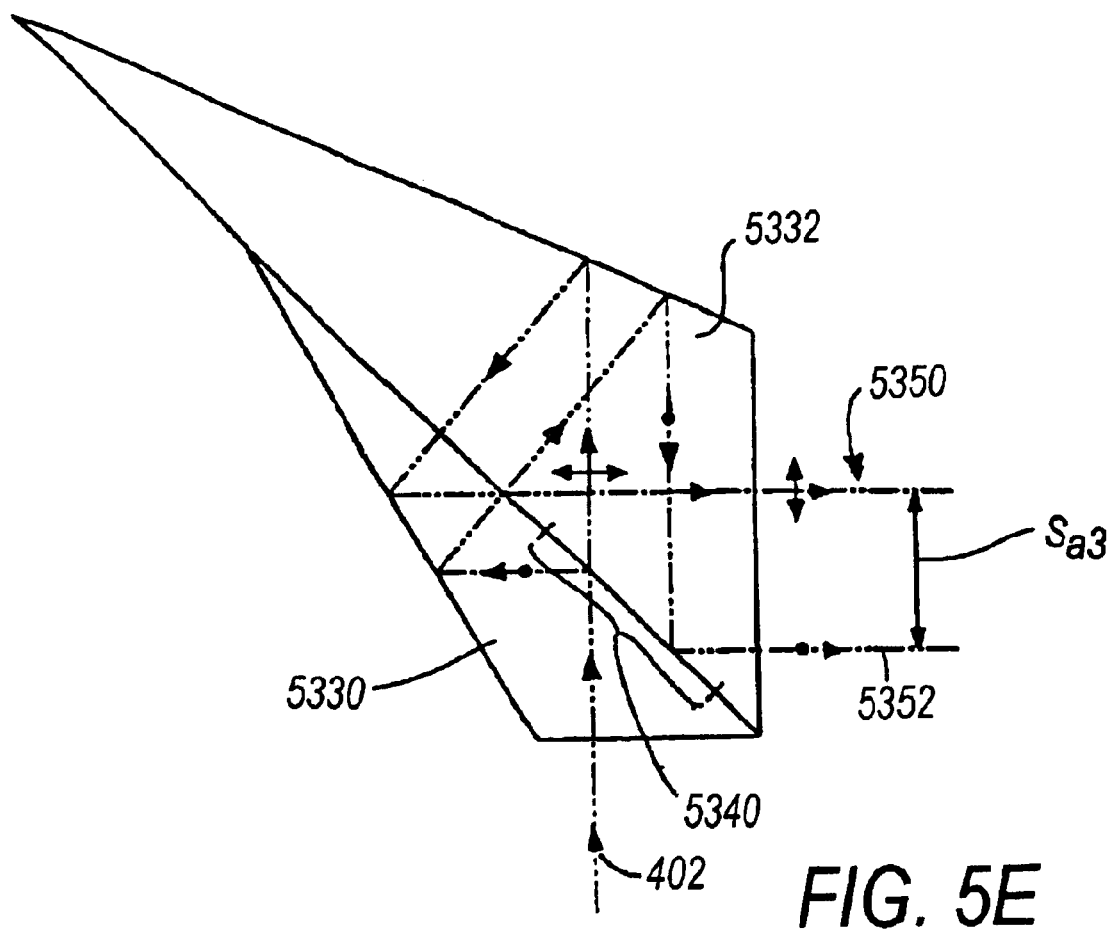
FIG. 5e is schematic diagram of another embodiment of a beam shearing assembly for use with the angle measuring interferometer of FIGS. 4a and 4b.

A second embodiment of beam-shearing assembly 410 is shown diagrammatically in FIG. 5e and comprises two prisms 5330 and 5332 and polarization beam-splitter interface 5340. A first component of input beam 402 is transmitted twice by polarization beam-splitter interface 5340 and reflected by facets of prisms 5330 and 5332 to form sheared beam 5350. A second component of input beam 402 is reflected twice by polarization beam-splitter interface 5340 and reflected by facets of prisms 5330 and 5332 to form sheared beam 5352.

The two prisms 5330 and 5332 and polarization beam-splitter interface 5340 exhibit properties the same as a Penta prism with respect to relationship of the direction of propagation of input beam 402 and the directions of propagation for beams 5350 and 5352. Prisms 5330 and 5332 are preferably isomorphic with relative sizes selected to introduce a beam shear $S_{a3}$ between beams 5350 and 5352. The optical paths in refractive media are substantially the same for beam 5350 and 5352. Beams 5350 and 5352 correspond to sheared beams 412 and 413, respectively, in FIG. 4a and their subsequent processing follows similarly to the embodiment described above with shear $S_3$ replaced by shear $S_{a3}$.

The interferometry systems described above provide highly accurate measurements. Such systems can be especially useful in lithography applications used in fabricating large scale integrated circuits such as computer chips and the like. Lithography is the key technology driver for the semiconductor manufacturing industry. Overlay improvement is one of the five most difficult challenges down to and below 100 nm line widths (design rules), see for example the *Semiconductor Industry Roadmap,* p82 (1997).

Overlay depends directly on the performance, i.e. accuracy and precision, of the distance measuring interferometers used to position the wafer and reticle (or mask) stages. Since a lithography tool may produce $50–100M/year of product, the economic value from improved performance distance measuring interferometers is substantial. Each 1% increase in yield of the lithography tool results in approximately $1M/year economic benefit to the integrated circuit manufacturer and substantial competitive advantage to the lithography tool vendor.

The function of a lithography tool is to direct spatially patterned radiation onto a photoresist-coated wafer. The process involves determining which location of the wafer is to receive the radiation (alignment) and applying the radiation to the photoresist at that location (exposure).

To properly position the wafer, the wafer includes alignment marks on the wafer that can be measured by dedicated sensors. The measured positions of the alignment marks define the location of the wafer within the tool. This information, along with a specification of the desired patterning of the wafer surface, guides the alignment of the wafer relative to the spatially patterned radiation. Based on such information, a translatable stage supporting the photoresist-coated wafer moves the wafer such that the radiation will expose the correct location of the wafer.

During exposure, a radiation source illuminates a patterned reticle, which scatters the radiation to produce the spatially patterned radiation. The reticle is also referred to as a mask, and these terms are used interchangeably below. In the case of reduction lithography, a reduction lens collects the scattered radiation and forms a reduced image of the reticle pattern. Alternatively, in the case of proximity printing, the scattered radiation propagates a small distance (typically on the order of microns) before contacting the wafer to produce a 1:1 image of the reticle pattern. The radiation initiates photo-chemical processes in the resist that convert the radiation pattern into a latent image within the resist.

Interferometry systems are important components of the positioning mechanisms that control the position of the wafer and reticle, and register the reticle image on the wafer. If such interferometry systems include the features described above, the accuracy of distances measured by the systems increases as error contributions to the distance measurement are minimized.

In general, the lithography system, also referred to as an exposure system, typically includes an illumination system and a wafer positioning system. The illumination system includes a radiation source for providing radiation such as ultraviolet, visible, x-ray, electron, or ion radiation, and a reticle or mask for imparting the pattern to the radiation, thereby generating the spatially patterned radiation. In addition, for the case of reduction lithography, the illumination system can include a lens assembly for imaging the spatially patterned radiation onto the wafer. The imaged radiation exposes resist coated onto the wafer. The illumination system also includes a mask stage for supporting the mask and a positioning system for adjusting the position of the mask stage relative to the radiation directed through the mask. The wafer positioning system includes a wafer stage for supporting the wafer and a positioning system for adjusting the position of the wafer stage relative to the imaged radiation. Fabrication of integrated circuits can include multiple exposing steps. For a general reference on lithography, see, for example, J. R. Sheats and B. W. Smith, in *Microlithography: Science and Technology* (Marcel Dekker, Inc., New York, 1998), the contents of which is incorporated herein by reference.

Interferometry systems described above can be used to precisely measure the positions of each of the wafer stage and mask stage relative to other components of the exposure system, such as the lens assembly, radiation source, or support structure. In such cases, the interferometry system can be attached to a stationary structure and the measurement object attached to a movable element such as one of the mask and wafer stages. Alternatively, the situation can be reversed, with the interferometry system attached to a movable object and the measurement object attached to a stationary object.

More generally, such interferometry systems can be used to measure the position of any one component of the exposure system relative to any other component of the exposure system, in which the interferometry system is attached to, or supported by, one of the components and the measurement object is attached, or is supported by the other of the components.

Figure 6A:
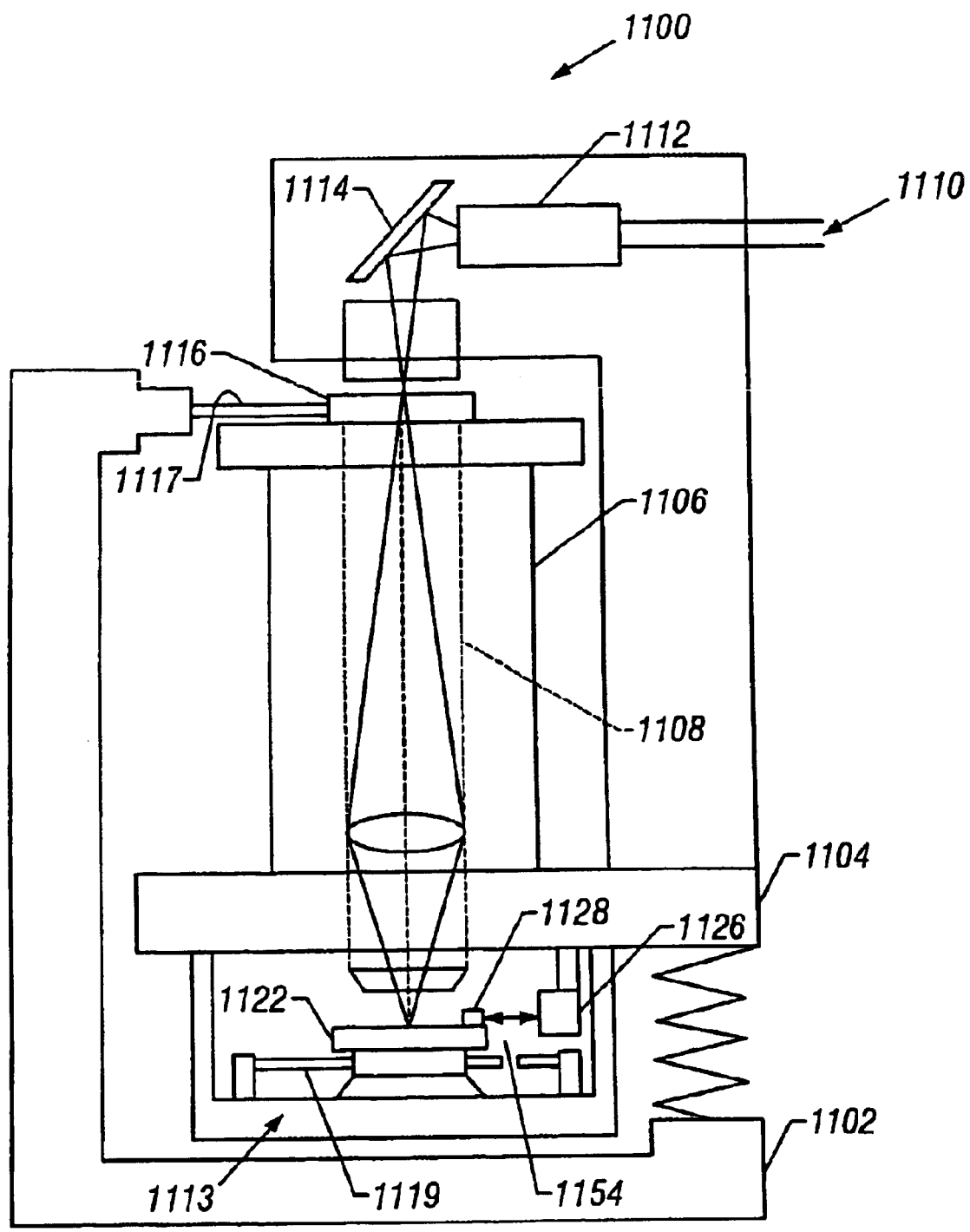
FIG. 6a is a schematic diagram of a lithography system used to make integrated circuits.

An example of a lithography scanner 1100 using an interferometry system 1126 is shown in FIG. 6a. The interferometry system is used to precisely measure the position of a wafer (not shown) within an exposure system. Here, stage 1122 is used to position and support the wafer relative to an exposure station. Scanner 1100 includes a frame 1102, which carries other support structures and various components carried on those structures. An exposure base 1104 has mounted on top of it a lens housing 1106 atop of which is mounted a reticle or mask stage 1116, which is used to support a reticle or mask. A positioning system for positioning the mask relative to the exposure station is indicated schematically by element 1117. Positioning system 1117 can include, e.g., piezoelectric transducer elements and corresponding control electronics. Although, it is not included in this described embodiment, one or more of the interferometry systems described above can also be used to precisely measure the position of the mask stage as well as other moveable elements whose position must be accurately monitored in processes for fabricating lithographic structures (see supra Sheats and Smith *Microlithography: Science and Technology*).

Suspended below exposure base 1104 is a support base 1113 that carries wafer stage 1122. Stage 1122 includes a plane mirror 1128 for reflecting a measurement beam 1154 directed to the stage by interferometry system 1126. A positioning system for positioning stage 1122 relative to interferometry system 1126 is indicated schematically by element 1119. Positioning system 1119 can include, e.g., piezoelectric transducer elements and corresponding control electronics. The measurement beam reflects back to the interferometry system, which is mounted on exposure base 1104. The interferometry system can be any of the embodiments described previously.

During operation, a radiation beam 1110, e.g., an ultraviolet (UV) beam from a UV laser (not shown), passes through a beam shaping optics assembly 1112 and travels downward after reflecting from mirror 1114. Thereafter, the radiation beam passes through a mask (not shown) carried by mask stage 1116. The mask (not shown) is imaged onto a wafer (not shown) on wafer stage 1122 via a lens assembly 1108 carried in a lens housing 1106. Base 1104 and the various components supported by it are isolated from environmental vibrations by a damping system depicted by spring 1120.

In other embodiments of the lithographic scanner, one or more of the interferometry systems described previously can be used to measure distance along multiple axes and angles associated for example with, but not limited to, the wafer and reticle (or mask) stages. Also, rather than a UV laser beam, other beams can be used to expose the wafer including, e.g., x-ray beams, electron beams, ion beams, and visible optical beams.

In some embodiments, the lithographic scanner can include what is known in the art as a column reference. In such embodiments, the interferometry system 1126 directs the reference beam (not shown) along an external reference path that contacts a reference mirror (not shown) mounted on some structure that directs the radiation beam, e.g., lens housing 1106. The reference mirror reflects the reference beam back to the interferometry system. The interference signal produce by interferometry system 1126 when combining measurement beam 1154 reflected from stage 1122 and the reference beam reflected from a reference mirror mounted on the lens housing 1106 indicates changes in the position of the stage relative to the radiation beam. Furthermore, in other embodiments the interferometry system 1126 can be positioned to measure changes in the position of reticle (or mask) stage 1116 or other movable components of the scanner system. Finally, the interferometry systems can be used in a similar fashion with lithography systems involving steppers, in addition to, or rather than, scanners.

Figure 6B:
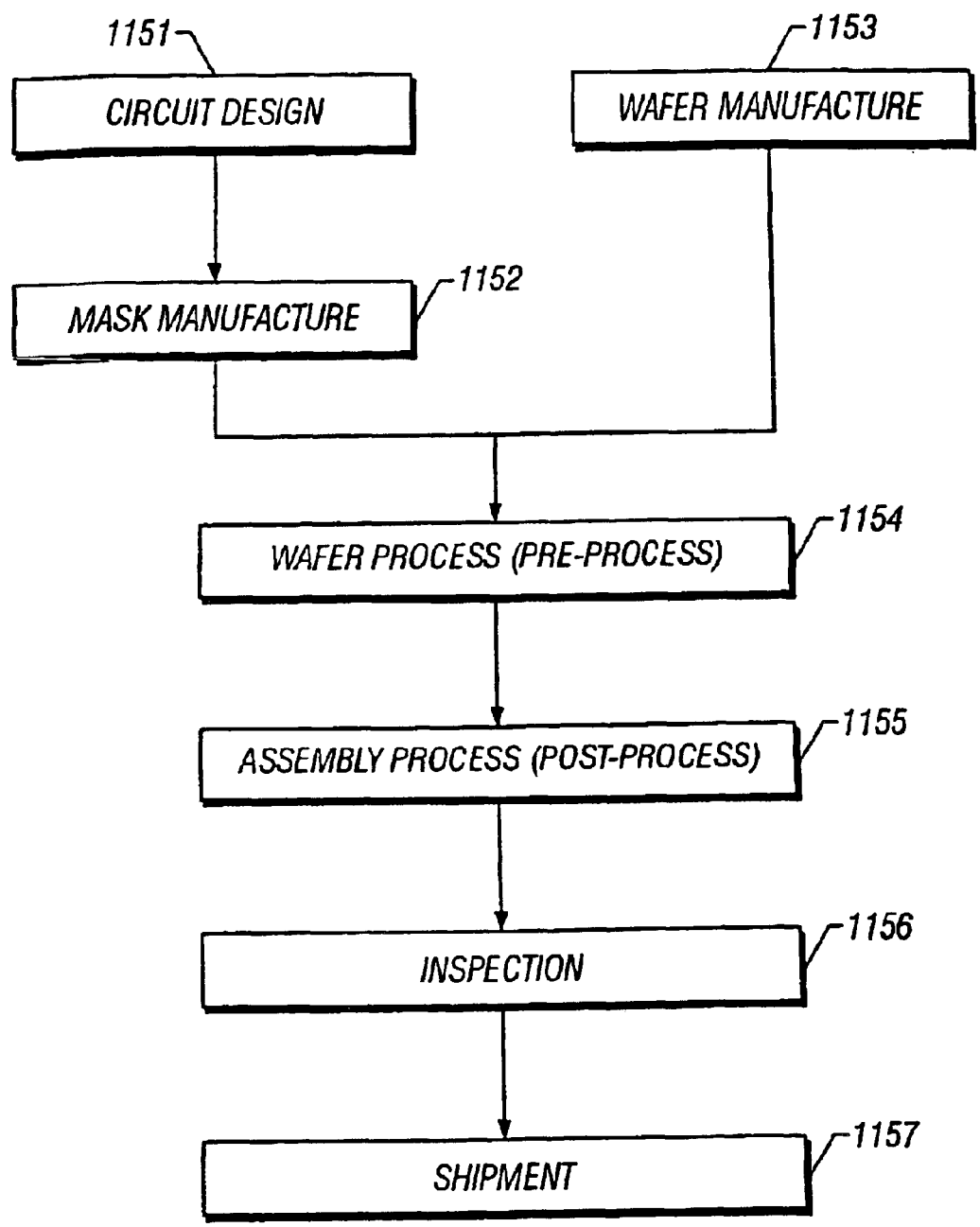
FIGS. 6b–6c are flow charts that describe steps for making integrated circuits.

As is well known in the art, lithography is a critical part of manufacturing methods for making semiconducting devices. For example, U.S. Pat. No. 5,483,343 outlines steps for such manufacturing methods. These steps are described below with reference to FIGS. 6b and 6c. FIG. 6b is a flow chart of the sequence of manufacturing a semiconductor device such as a semiconductor chip (e.g. IC or LSI), a liquid crystal panel or a CCD. Step 1151 is a design process for designing the circuit of a semiconductor device. Step 1152 is a process for manufacturing a mask on the basis of the circuit pattern design. Step 1153 is a process for manufacturing a wafer by using a material such as silicon.

Step 1154 is a wafer process which is called a pre-process wherein, by using the so prepared mask and wafer, circuits are formed on the wafer through lithography. To form circuits on the wafer that correspond with sufficient spatial resolution those patterns on the mask, interferometric positioning of the lithography tool relative the wafer is necessary. The interferometry methods and systems described herein can be especially useful to improve the effectiveness of the lithography used in the wafer process.

Step 1155 is an assembling step, which is called a post-process wherein the wafer processed by step 1154 is formed into semiconductor chips. This step includes assembling (dicing and bonding) and packaging (chip sealing).

Step 1156 is an inspection step wherein operability check, durability check and so on of the semiconductor devices produced by step 1155 are carried out. With these processes, semiconductor devices are finished and they are shipped (step 1157).

Figure 6C:
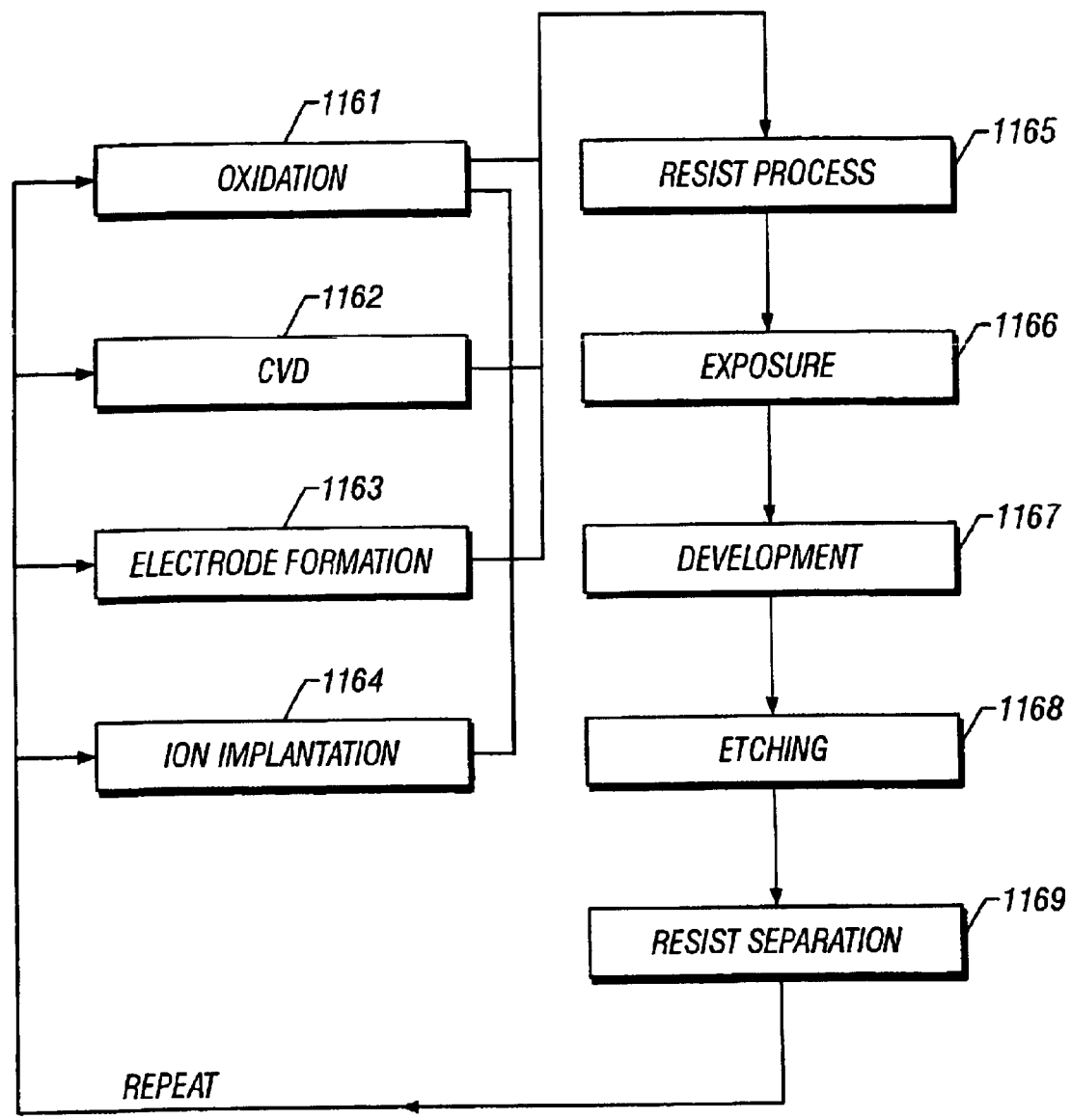

FIG. 6c is a flow chart showing details of the wafer process. Step 1161 is an oxidation process for oxidizing the surface of a wafer. Step 1162 is a CVD process for forming an insulating film on the wafer surface. Step 1163 is an electrode forming process for forming electrodes on the wafer by vapor deposition. Step 1164 is an ion implanting process for implanting ions to the wafer. Step 1165 is a resist process for applying a resist (photosensitive material) to the wafer. Step 1166 is an exposure process for printing, by exposure (i.e., lithography), the circuit pattern of the mask on the wafer through the exposure apparatus described above. Once again, as described above, the use of the interferometry systems and methods described herein improve the accuracy and resolution of such lithography steps.

Step 1167 is a developing process for developing the exposed wafer. Step 1168 is an etching process for removing portions other than the developed resist image. Step 1169 is a resist separation process for separating the resist material remaining on the wafer after being subjected to the etching process. By repeating these processes, circuit patterns are formed and superimposed on the wafer.

The interferometry systems described above can also be used in other applications in which the relative position of an object needs to be measured precisely. For example, in applications in which a write beam such as a laser, x-ray, ion, or electron beam, marks a pattern onto a substrate as either the substrate or beam moves, the interferometry systems can be used to measure the relative movement between the substrate and write beam.

Figure 7:
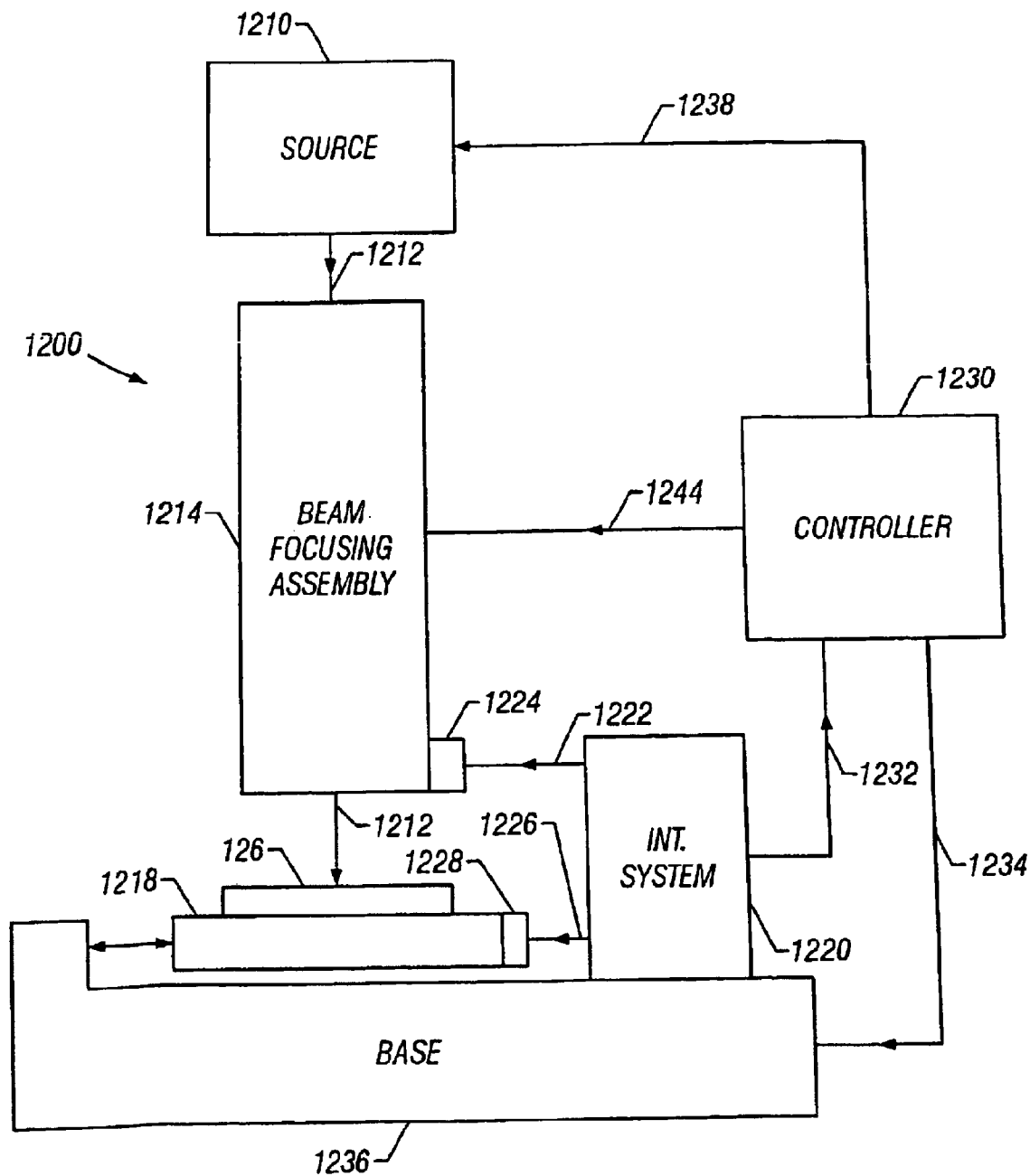
FIG. 7 is a schematic of a beam writing system.

As an example, a schematic of a beam writing system 1200 is shown in FIG. 7. A source 1210 generates a write beam 1212, and a beam focusing assembly 1214 directs the radiation beam to a substrate 1216 supported by a movable stage 1218. To determine the relative position of the stage, an interferometry system 1220 directs a reference beam 1222 to a mirror 1224 mounted on beam focusing assembly 1214 and a measurement beam 1226 to a mirror 1228 mounted on stage 1218. Since the reference beam contacts a mirror mounted on the beam focusing assembly, the beam writing system is an example of a system that uses a column reference. Interferometry system 1220 can be any of the interferometry systems described previously. Changes in the position measured by the interferometry system correspond to changes in the relative position of write beam 1212 on substrate 1216. Interferometry system 1220 sends a measurement signal 1232 to controller 1230 that is indicative of the relative position of write beam 1212 on substrate 1216. Controller 1230 sends an output signal 1234 to a base 1236 that supports and positions stage 1218. In addition, controller 1230 sends a signal 1238 to source 1210 to vary the intensity of, or block, write beam 1212 so that the write beam contacts the substrate with an intensity sufficient to cause photophysical or photochemical change only at selected positions of the substrate.

Furthermore, in some embodiments, controller 1230 can cause beam focusing assembly 1214 to scan the write beam over a region of the substrate, e.g., using signal 1244. As a result, controller 1230 directs the other components of the system to pattern the substrate. The patterning is typically based on an electronic design pattern stored in the controller. In some applications the write beam patterns a resist coated on the substrate and in other applications the write beam directly patterns, e.g., etches, the substrate.

An important application of such a system is the fabrication of masks and reticles used in the lithography methods described previously. For example, to fabricate a lithography mask an electron beam can be used to pattern a chromium-coated glass substrate. In such cases where the write beam is an electron beam, the beam writing system encloses the electron beam path in a vacuum. Also, in cases where the write beam is, e.g., an electron or ion beam, the beam focusing assembly includes electric field generators such as quadrapole lenses for focusing and directing the charged particles onto the substrate under vacuum. In other cases where the write beam is a radiation beam, e.g., x-ray, UV, or visible radiation, the beam focusing assembly includes corresponding optics and for focusing and directing the radiation to the substrate.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
   directing two beams derived from a common source along different paths;
   producing a first output beam derived from a first portion of each of the two beams;
   producing a second output beam derived from a second portion of each of the two beams; and
   calculating a product of a first signal derived from the first output beam and a second signal derived from the second output beam.

2. The method of claim 1, wherein the two beams are directed along the different paths within a distance measuring interferometer.

3. method of claim 2, wherein the distance measuring interferometer is a single-pass interferometer.

4. The method of claim 2, wherein the distance measuring interferometer is a double-pass interferometer.

5. The method of claim 1, wherein the two beams are directed along the different paths within an angle measuring interferometer.

6. The method of claim 5, wherein the angle-measuring interferometer comprises a beam shearing assembly.

7. The method of claim 1, wherein calculating the product of the first and second signals substantially eliminates at least some first-order cyclic errors present in the first and second signals from the calculated product.

8. The method of claim 1, further comprising extracting from the calculated product information related to the different paths.

9. The method of claim 8, wherein the information corresponds to a change in position of an object in one of the different paths.

10. The method of claim 8, wherein the two beams are derived from an input beam, and wherein the information corresponds to an angular deviation of the input beam.

11. The method of claim 1, wherein the first portions have a first common polarization, and the second portions have a second common polarization different from the first common polarization.

12. The method of claim 11, wherein the first and second common polarizations are substantially orthogonal.

13. The method of claim 11, wherein producing the first and second output beams comprises combining the two beams and directing the combined beams to a polarizing beam-splitter to produce the first and second output beams.

14. The method of claim 11, wherein producing the first and second output beams comprises combining the two beams, directing the combined beams to a non-polarizing beam-splitter to produce first and second intermediate beams, and directing each of the intermediate beams to a polarizer to produce the first and second output beams.

15. The method of claim 11, wherein producing the first and second output beams comprises separating each of the two beams into the portion having the first common polarization and the portion having the second common polarization, combining the portions having the first common polarization to produce the first output beam, and combining the portions having the second common polarization to produce the second output beam.

16. The method of claim 11, further comprising passing one of the directed beams and not the other of the directed beams through a first polarizer prior to producing the first and second output beams.

17. The method of claim 16, further comprising passing the other of the directed beams through a second polarizer prior to producing the first and second output beams.

18. The method of claim 17, wherein the first and second polarizers are oriented to pass orthogonal linear polarizations.

19. The method of claim 16, wherein the first common polarization is a linear polarization, and wherein the first polarizer is oriented at 45 degrees to the first common linear polarization.

20. The method of claim 11, further comprising directing an input beam derived from the common source to a polarizing beam-splitter to produce the two beams directed along the different paths.

21. The method of claim 1, wherein the two beams directed along the different paths have frequencies that differ by a heterodyne frequency.

22. The method of claim 21, wherein the product of the first signal and the second signal comprises a superheterodyne term.

23. The method of claim 22, further comprising extracting a phase of the superheterodyne signal.

24. The method of claim 21, further comprising generating the first signal by measuring an intensity of the first output beam and generating the second signal by measuring an intensity of the second output beam.

25. The method of claim 24, wherein generating the first and second signals further comprises passing each of the measured intensities through a high band pass filter.

26. A lithography method for use in fabricating integrated circuits on a wafer, the method comprising:
   supporting the wafer on a moveable stage;
   imaging spatially patterned radiation onto the wafer;
   adjusting the position of the stage; and
   measuring the position of the stage using the method of claim 1.

27. A lithography method for use in the fabrication of integrated circuits comprising:
   directing input radiation through a mask to produce spatially patterned radiation;
   positioning the mask relative to the input radiation;
   measuring the position of the mask relative to the input radiation using the method of claim 1; and
   imaging the spatially patterned radiation onto a wafer.

28. A lithography method for fabricating integrated circuits on a wafer comprising:
   positioning a first component of a lithography system relative to a second component of a lithography system to expose the wafer to spatially patterned radiation; and measuring the position of the first component relative to the second component using the method of claim 1.

29. A method for fabricating integrated circuits, the method comprising the lithography method of claim 26.

30. A method for fabricating integrated circuits, the method comprising the lithography method of claim 27.

31. A method for fabricating integrated circuits, the method comprising the lithography method of claim 28.

32. A beam writing method for use in fabricating a lithography mask, the method comprising:

directing a write beam to a substrate to pattern the substrate;

positioning the substrate relative to the write beam; and measuring the position of the substrate relative to the write beam using the interferometry method of claim 1.

33. A method for reducing cyclic error contributions in an interferometry measurement, the method comprising:

directing two beams derived from a common source along different paths in an interferometer, wherein the two beams have orthogonal polarizations and frequencies that differ by a heterodyne frequency;

producing a first output beam derived from a portion of each of the two beams having a first common polarization;

producing a second output beam derived from a portion of each of the two beams having a second common polarization substantially orthogonal to the first common polarization;

generating first and second signals derived from intensity measurements of the first and second output beams, respectively;

calculating a superheterodyne signal corresponding to a product of the first and second signals to substantially eliminate at least some first-order cyclic errors present in the first and second signals; and extracting the phase of the superheterodyne signal to provide information related to the different paths in the interferometer.

34. An apparatus comprising:

an interferometer configured to direct two beams derived from a common source along different paths and produce a first output beam derived from a first portion of each of the two beams and a second output beam derived from a second portion of each of the two beams;

first and second detectors positioned to measure an intensity of the first and second output beams, respectively; and an electronic processor coupled to the first and second detectors, wherein during operation the electronic processor calculates a product of a first signal derived from the intensity of the first output beam and a second signal derived from the intensity of the second output beam.

35. The apparatus of claim 34, wherein the interferometer comprises a distance measuring interferometer.

36. The apparatus of claim 35, wherein the distance measuring interferometer is a single-pass interferometer.

37. The apparatus of claim 35, wherein the distance measuring interferometer is a double-pass interferometer.

38. The apparatus of claim 34, wherein the interferometer comprising an angle measuring interferometer.

39. The apparatus of claim 38, wherein the angle-measuring interferometer comprises a beam shearing assembly.

40. The apparatus of claim 34, wherein the product calculated by the electronic processor substantially eliminates at least some first-order cyclic errors present in the first and second signals.

41. The apparatus of claim 34, wherein during operation the electronic processor extracts from the calculated product information related to the different paths in the interferometer.

42. The apparatus of claim 44, wherein the information corresponds to a change in position of an object in one of the different paths.

43. The apparatus of claim 44, wherein the interferometer is configured to derive the two beams from an input beam, and wherein the information extracted by the electronic processor corresponds to an angular deviation of the input beam.

44. The apparatus of claim 43, wherein the interferometer is configured to cause the first portions to have a first common polarization and the second portions to have a second common polarization different from the first common polarization.

45. The apparatus of claim 44, wherein the interferometer comprises a polarizing beam splitter, and wherein the interferometer is configured to combine the two beams after directing them along the different paths and then direct the combined beams to the polarizing beam-splitter to produce the first and second output beams.

46. The apparatus of claim 44, wherein the interferometer comprises a non-polarizing beam splitter and two polarizers, and where the interferometer is configured to combine the two beams after directing them along the different paths, direct the combined beams to the non-polarizing beam-splitter to produce first and second intermediate beams, and direct each of the intermediate beams to a corresponding one of the polarizers to produce the first and second output beams.

47. The apparatus of claim 44, wherein the interferometer is configured to separate each of the two beams into the portion having the first common polarization and the portion having the second common polarization, combine the portions having the first common polarization to produce the first output beam, and combine the portions having the second common polarization to produce the second output beam.

48. The apparatus of claim 44, wherein the interferometer comprises a first polarizer and wherein the interferometer is configured to further pass one of the directed beams and not the other of the directed beams through the first polarizer prior to producing the first and second output beams.

49. The apparatus of claim 48, wherein the interferometer comprises a second polarizer and wherein the interferometer is configured to pass the other of the directed beams through the second polarizer prior to producing the first and second output beams.

50. The apparatus of claim 49, wherein the first and second polarizers are oriented to pass orthogonal linear polarizations.

51. The apparatus of claim 48, wherein the first common polarization is a linear polarization, and wherein the first polarizer is oriented at 45 degrees to the first common linear polarization.

52. The apparatus of claim 34, wherein the interferometer comprises a polarizing beam-splitter positioned to receive an input beam and produce the two beams to be directed along the different paths.

53. The apparatus of claim 34, further comprising the common source.

54. The apparatus of claim 53, wherein the common source is configured to introduce a heterodyne frequency difference between the two beams directed along the different paths by the interferometer.

55. The apparatus of claim 54, wherein the product calculated by the electronic processor comprises a superheterodyne term.

56. The apparatus of claim 55, wherein during operation the electronic processor extracts a phase of the superheterodyne signal.

57. The apparatus of claim 53, wherein the electronic processor comprises a high band pass filter, and wherein during operation the electronic processor passes the measured intensity for each of the first and second output beams through the high band pass filter to generate the first and second signals.

58. A lithography system for use in fabricating integrated circuits on a wafer, the system comprising:

a stage for supporting the wafer;

an illumination system for imaging spatially patterned radiation onto the wafer;

a positioning system for adjusting the position of the stage relative to the imaged radiation; and the apparatus of claim 34 for monitoring the position of the wafer relative to the imaged radiation.

59. A lithography system for use in fabricating integrated circuits on a wafer, the system comprising:

a stage for supporting the wafer; and an illumination system including a radiation source, a mask, a positioning system, a lens assembly, and the apparatus of claim 34, wherein during operation the source directs radiation through the mask to produce spatially patterned radiation, the positioning system adjusts the position of the mask relative to the radiation from the source, the lens assembly images the spatially patterned radiation onto the wafer, and the interferometry system monitors the position of the mask relative to the radiation from the source.

60. A beam writing system for use in fabricating a lithography mask, the system comprising:

a source providing a write beam to pattern a substrate;

a stage supporting the substrate;

a beam directing assembly for delivering the write beam to the substrate;

a positioning system for positioning the stage and beam directing assembly relative one another; and the apparatus of claim 34 for monitoring the position of the stage relative to the beam directing assembly.

* * * * *

UNITED STATES PATENT AND TRADEMARK OFFICE
CERTIFICATE OF CORRECTION

PATENT NO. : 6,806,961 B2
DATED : October 19, 2004
INVENTOR(S) : Hill

It is certified that error appears in the above-identified patent and that said Letters Patent is hereby corrected as shown below:

Title page,
Item [56], References Cited, OTHER PUBLICATIONS, "Hill publication" reference, replace "ervo" with -- Servo --.

Column 25,
Line 36, insert -- The -- before "method".

Column 28,
Lines 9 and 12, replace "claim 44" with -- claim 41 --.
Line 17, replace "claim 43" with -- claim 34 --.

Signed and Sealed this

Thirtieth Day of August, 2005

JON W. DUDAS
*Director of the United States Patent and Trademark Office*